(12) United States Patent
Baca et al.

(10) Patent No.: US 10,429,593 B2
(45) Date of Patent: Oct. 1, 2019

(54) FIBER OPTIC CONNECTORS AND CONNECTORIZATION EMPLOYING ADAPTER EXTENSIONS AND/OR FLEXURES

(71) Applicant: Corning Research & Development Corporation, Corning, NY (US)

(72) Inventors: Adra Baca, Hickory, NC (US); Joel Christopher Rosson, Hickory, NC (US)

(73) Assignee: Corning Research & Development Corporation, Hickory, NC (US)

(*) Notice: Subject to any disclaimer, the term of this patent is extended or adjusted under 35 U.S.C. 154(b) by 0 days.

(21) Appl. No.: 16/015,583

(22) Filed: Jun. 22, 2018

(65) Prior Publication Data

US 2019/0162914 A1    May 30, 2019

Related U.S. Application Data

(63) Continuation-in-part of application No. PCT/US2017/064063, filed on Nov. 30, 2017.

(51) Int. Cl.
*G02B 6/38* (2006.01)

(52) U.S. Cl.
CPC ......... *G02B 6/3869* (2013.01); *G02B 6/3825* (2013.01); *G02B 6/3887* (2013.01)

(58) Field of Classification Search
CPC ... G02B 6/3869; G02B 6/3825; G02B 6/3887
USPC .......................................................... 385/88
See application file for complete search history.

(56) References Cited

U.S. PATENT DOCUMENTS

| | | |
|---|---|---|
| 3,074,107 A | 1/1963 | Mase et al. |
| 3,532,783 A | 10/1970 | Pusey et al. |
| 3,792,284 A | 2/1974 | Kaelin |
| 4,148,557 A | 4/1979 | Garvey |
| 4,188,088 A | 2/1980 | Anderson et al. |
| 4,354,731 A | 10/1982 | Mouissie |
| 4,413,880 A | 11/1983 | Forrest et al. |
| 4,515,434 A | 5/1985 | Margolin et al. |
| 4,560,232 A | 12/1985 | O'Hara |
| 4,615,581 A | 10/1986 | Morimoto |
| 4,634,214 A | 1/1987 | Cannon, Jr. et al. |

(Continued)

FOREIGN PATENT DOCUMENTS

| | | |
|---|---|---|
| CN | 1213783 A | 4/1999 |
| CN | 1231430 A | 10/1999 |

(Continued)

OTHER PUBLICATIONS

International Search Report and Written Opinion received for International Patent Application Serial No. PCT/US2017/064092 dated Feb. 23, 2018, 16 pages.

(Continued)

*Primary Examiner* — Akm E Ullah
(74) *Attorney, Agent, or Firm* — Michael E. Carroll, Jr.

(57) ABSTRACT

Fiber optic connectors, connector housings, connectorized cable assemblies, and methods for the connectorization of cable assemblies are provided with particular cable adapter features, adapter extensions, multi-diametrical sealing flexures, subcutaneous sealing elements, and combinations thereof, for improved connector and cable performance, integrity, and durability.

26 Claims, 12 Drawing Sheets

(56) References Cited

U.S. PATENT DOCUMENTS

| | | |
|---|---|---|
| 4,684,205 A | 8/1987 | Margolin et al. |
| 4,688,200 A | 8/1987 | Poorman et al. |
| 4,699,458 A | 10/1987 | Ohtsuki et al. |
| 4,705,352 A | 11/1987 | Margolin et al. |
| 4,715,675 A | 12/1987 | Kevern et al. |
| 4,763,983 A | 8/1988 | Keith |
| 4,783,137 A | 11/1988 | Kosman et al. |
| 4,854,664 A | 8/1989 | McCartney |
| 4,856,867 A | 8/1989 | Gaylin |
| 4,902,238 A | 2/1990 | Iacobucci |
| 4,913,514 A | 4/1990 | Then |
| 4,921,413 A | 5/1990 | Blew |
| 4,960,318 A | 10/1990 | Nilsson et al. |
| 4,961,623 A | 10/1990 | Midkiff et al. |
| 4,964,688 A | 10/1990 | Caldwell et al. |
| 4,995,836 A | 2/1991 | Toramoto |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A * | 11/1991 | Lampert ............... G02B 6/264 |
| | | 385/60 |
| 5,095,176 A | 3/1992 | Harbrecht et al. |
| 5,129,023 A | 7/1992 | Anderson et al. |
| 5,134,677 A | 7/1992 | Leung et al. |
| 5,136,683 A | 8/1992 | Aoki et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,263,105 A | 11/1993 | Johnson et al. |
| 5,313,540 A | 5/1994 | Ueda et al. |
| 5,317,663 A * | 5/1994 | Beard ................ G02B 6/3825 |
| | | 385/70 |
| 5,367,594 A | 11/1994 | Essert et al. |
| 5,371,823 A | 12/1994 | Barrett et al. |
| 5,381,494 A | 1/1995 | O'Donnell et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,553,186 A | 9/1996 | Allen |
| 5,569,050 A | 10/1996 | Lloyd |
| 5,600,747 A | 2/1997 | Yamakawa et al. |
| 5,631,993 A | 5/1997 | Cloud et al. |
| 5,647,045 A | 7/1997 | Robinson et al. |
| 5,682,451 A | 10/1997 | Lee et al. |
| 5,748,821 A | 5/1998 | Schempp et al. |
| 5,781,686 A | 7/1998 | Robinson et al. |
| 5,789,701 A | 8/1998 | Wettengel et al. |
| 5,791,918 A | 8/1998 | Pierce |
| 5,862,290 A | 1/1999 | Burek et al. |
| 5,913,001 A | 6/1999 | Nakajima et al. |
| 5,923,804 A | 7/1999 | Rosson |
| 5,960,141 A | 9/1999 | Sasaki et al. |
| 5,993,070 A | 11/1999 | Tamekuni et al. |
| 6,079,881 A | 6/2000 | Roth |
| 6,108,482 A | 8/2000 | Roth |
| 6,112,006 A | 8/2000 | Foss |
| 6,149,313 A | 11/2000 | Giebel et al. |
| 6,151,432 A | 11/2000 | Nakajima et al. |
| RE37,028 E | 1/2001 | Cooke et al. |
| 6,173,097 B1 | 1/2001 | Throckmorton et al. |
| 6,179,482 B1 | 1/2001 | Takizawa et al. |
| 6,188,822 B1 | 2/2001 | McAlpine et al. |
| 6,206,579 B1 | 3/2001 | Selfridge et al. |
| 6,229,944 B1 | 5/2001 | Yokokawa et al. |
| 6,234,683 B1 | 5/2001 | Waldron et al. |
| 6,234,685 B1 | 5/2001 | Carlisle et al. |
| 6,249,628 B1 | 6/2001 | Rutterman et al. |
| 6,256,438 B1 | 7/2001 | Gimblet |
| 6,261,006 B1 | 7/2001 | Selfridge |
| 6,264,374 B1 | 7/2001 | Selfridge et al. |
| 6,287,016 B1 | 9/2001 | Weigel |
| 6,305,849 B1 | 10/2001 | Roehrs et al. |
| 6,356,390 B1 | 3/2002 | Hall, Jr. |
| 6,356,690 B1 | 3/2002 | McAlpine et al. |
| 6,357,929 B1 | 3/2002 | Roehrs et al. |
| 6,371,660 B1 | 4/2002 | Roehrs et al. |
| 6,375,363 B1 * | 4/2002 | Harrison ............. G02B 6/3825 |
| | | 385/77 |
| 6,379,054 B2 | 4/2002 | Throckmmton et al. |
| 6,422,764 B1 | 7/2002 | Marrs |
| 6,427,035 B1 | 7/2002 | Mahony |
| 6,439,780 B1 | 8/2002 | Mudd et al. |
| 6,466,725 B2 | 10/2002 | Battey et al. |
| 6,496,641 B1 | 12/2002 | Mahony |
| 6,501,888 B2 | 12/2002 | Gimblet et al. |
| 6,522,804 B1 | 2/2003 | Mahony |
| 6,529,663 B1 | 3/2003 | Parris et al. |
| 6,539,147 B1 | 3/2003 | Mahony |
| 6,540,410 B2 | 4/2003 | Childers et al. |
| 6,542,674 B1 | 4/2003 | Gimblet |
| 6,546,175 B1 | 4/2003 | Wagman et al. |
| 6,579,014 B2 | 6/2003 | Melton et al. |
| 6,599,026 B1 | 7/2003 | Fahrnbauer et al. |
| 6,599,027 B2 | 7/2003 | Miyake et al. |
| 6,614,980 B1 | 9/2003 | Mahony |
| 6,618,526 B2 | 9/2003 | Jackman et al. |
| 6,619,697 B2 | 9/2003 | Griffioen et al. |
| 6,621,964 B2 | 9/2003 | Quinn et al. |
| 6,625,375 B1 | 9/2003 | Mahony |
| 6,648,520 B2 | 11/2003 | McDonald et al. |
| 6,668,127 B1 | 12/2003 | Mahony |
| 6,678,448 B2 | 1/2004 | Maisel et al. |
| 6,685,361 B1 | 2/2004 | Rubino et al. |
| 6,714,708 B2 | 3/2004 | McAlpine et al. |
| 6,714,710 B2 | 3/2004 | Gimblet |
| 6,729,773 B1 | 5/2004 | Finona et al. |
| 6,738,555 B1 | 5/2004 | Cooke et al. |
| 6,748,147 B2 | 6/2004 | Quinn et al. |
| 6,771,861 B2 | 8/2004 | Wagner et al. |
| 6,785,450 B2 | 8/2004 | Wagman et al. |
| 6,789,950 B1 | 9/2004 | Loder et al. |
| 6,809,265 B1 | 10/2004 | Gladd et al. |
| 6,848,838 B2 | 2/2005 | Doss et al. |
| 6,899,467 B2 | 5/2005 | McDonald et al. |
| 6,909,821 B2 | 6/2005 | Ravasio et al. |
| 6,944,387 B2 * | 9/2005 | Howell ............... G02B 6/3825 |
| | | 385/135 |
| 7,011,454 B2 | 3/2006 | Caveney et al. |
| 7,025,507 B2 | 4/2006 | de Marchi |
| 7,079,734 B2 | 7/2006 | Seddon et al. |
| 7,090,406 B2 | 8/2006 | Melton et al. |
| 7,090,407 B2 | 8/2006 | Melton et al. |
| 7,104,702 B2 | 9/2006 | Barnes et al. |
| 7,111,990 B2 | 9/2006 | Melton et al. |
| 7,113,679 B2 | 9/2006 | Melton et al. |
| 7,120,347 B2 | 10/2006 | Blackwell, Jr. et al. |
| 7,137,742 B2 | 11/2006 | Theuerkorn et al. |
| 7,146,090 B2 | 12/2006 | Vo et al. |
| 7,165,893 B2 | 1/2007 | Schmitz |
| 7,178,990 B2 | 2/2007 | Caveney et al. |
| 7,184,634 B2 | 2/2007 | Hurley et al. |
| 7,204,644 B2 | 4/2007 | Barnes et al. |
| 7,213,975 B2 | 5/2007 | Khemakhem et al. |
| 7,228,047 B1 | 6/2007 | Szilagyi et al. |
| 7,241,056 B1 | 7/2007 | Kuffel et al. |
| 7,270,487 B2 | 9/2007 | Billman et al. |
| 7,277,614 B2 | 10/2007 | Cody et al. |
| 7,302,152 B2 | 11/2007 | Luther et al. |
| 7,330,629 B2 | 2/2008 | Cooke et al. |
| 7,333,708 B2 | 2/2008 | Blackwell, Jr. et al. |
| 7,444,056 B2 | 10/2008 | Allen et al. |
| 7,467,896 B2 | 12/2008 | Melton et al. |
| 7,489,849 B2 | 2/2009 | Reagan et al. |
| 7,565,055 B2 | 7/2009 | Reagan et al. |
| 7,621,675 B1 | 11/2009 | Bradley |
| 7,627,222 B2 | 12/2009 | Reagan et al. |
| 7,653,282 B2 | 1/2010 | Blackwell, Jr. et al. |
| 7,680,388 B2 | 3/2010 | Reagan et al. |
| 7,709,733 B1 | 5/2010 | Plankell |
| 7,740,409 B2 | 6/2010 | Bolton et al. |

(56) References Cited

U.S. PATENT DOCUMENTS

| | | |
|---|---|---|
| 7,753,596 B2 | 7/2010 | Cox |
| 7,762,726 B2* | 7/2010 | Lu .................... G02B 6/3816 |
| | | 385/53 |
| 7,785,015 B2 | 8/2010 | Melton et al. |
| 7,806,599 B2 | 10/2010 | Margolin et al. |
| 7,844,148 B2 | 11/2010 | Jenkins et al. |
| 7,844,160 B2 | 11/2010 | Reagan et al. |
| 7,903,923 B2 | 3/2011 | Gronvall et al. |
| 7,918,609 B2 | 4/2011 | Melton et al. |
| 7,942,590 B2 | 5/2011 | Lu et al. |
| 8,025,445 B2 | 9/2011 | Rambow et al. |
| 8,213,761 B2 | 7/2012 | Gronvall et al. |
| 8,218,935 B2 | 7/2012 | Reagan et al. |
| 8,267,596 B2 | 9/2012 | Theuerkorn |
| 8,272,792 B2 | 9/2012 | Coleman et al. |
| RE43,762 E | 10/2012 | Smith et al. |
| 8,301,004 B2 | 10/2012 | Cooke et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,520,996 B2 | 8/2013 | Cowen et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,764,316 B1 | 7/2014 | Barnette et al. |
| 8,770,861 B2 | 7/2014 | Smith et al. |
| 9,182,567 B2* | 11/2015 | Mullaney .............. G02B 6/3821 |
| 9,513,444 B2 | 12/2016 | Barnette, Jr. et al. |
| 9,551,842 B2 | 1/2017 | Theuerkorn |
| 9,618,718 B2* | 4/2017 | Islam .................... G02B 6/443 |
| 9,664,862 B2* | 5/2017 | Lu .................... G02B 6/3816 |
| 9,684,138 B2 | 6/2017 | Lu |
| 10,114,176 B2 | 10/2018 | Gimblet et al. |
| 2001/0019654 A1 | 9/2001 | Waldron et al. |
| 2001/0036345 A1 | 11/2001 | Gimble et al. |
| 2002/0062978 A1 | 5/2002 | Sakabe et al. |
| 2002/0064364 A1 | 5/2002 | Battey et al. |
| 2002/0122653 A1 | 9/2002 | Donaldson et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0094298 A1 | 5/2003 | Morrow et al. |
| 2003/0099448 A1 | 5/2003 | Gimblet |
| 2004/0047566 A1 | 3/2004 | McDonald et al. |
| 2004/0072454 A1 | 4/2004 | Nakajima et al. |
| 2004/0076377 A1 | 4/2004 | Mizukami et al. |
| 2004/0120662 A1 | 6/2004 | Lail et al. |
| 2004/0120663 A1 | 6/2004 | Lail et al. |
| 2004/0157499 A1 | 8/2004 | Nania et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2005/0054237 A1 | 3/2005 | Gladd et al. |
| 2005/0129379 A1 | 6/2005 | Reagan et al. |
| 2005/0175307 A1 | 8/2005 | Battey et al. |
| 2005/0232552 A1 | 10/2005 | Takahashi et al. |
| 2005/0281510 A1 | 12/2005 | Vo et al. |
| 2005/0281514 A1 | 12/2005 | Oki et al. |
| 2006/0045430 A1 | 3/2006 | Theuerkorn et al. |
| 2006/0093278 A1 | 5/2006 | Elkins, II et al. |
| 2006/0120672 A1 | 6/2006 | Cody et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0171638 A1 | 8/2006 | Dye |
| 2006/0269204 A1 | 11/2006 | Barth et al. |
| 2006/0269208 A1 | 11/2006 | Allen et al. |
| 2006/0280420 A1 | 12/2006 | Blackwell, Jr. et al. |
| 2006/0283619 A1 | 12/2006 | Kowalczyk et al. |
| 2006/0291787 A1 | 12/2006 | Seddon |
| 2007/0031100 A1 | 2/2007 | Garcia et al. |
| 2007/0031103 A1 | 2/2007 | Tinucci et al. |
| 2007/0077010 A1 | 4/2007 | Melton et al. |
| 2007/0098343 A1 | 5/2007 | Miller et al. |
| 2008/0080817 A1 | 4/2008 | Melton et al. |
| 2008/0138016 A1 | 6/2008 | Katagiyama et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0264664 A1 | 10/2008 | Dinh et al. |
| 2008/0273837 A1 | 11/2008 | Margolin et al. |
| 2009/0060421 A1 | 3/2009 | Parikh et al. |
| 2009/0148101 A1 | 6/2009 | Lu et al. |
| 2009/0148104 A1 | 6/2009 | Lu et al. |
| 2009/0185835 A1 | 7/2009 | Park et al. |
| 2009/0245743 A1 | 10/2009 | Cote et al. |
| 2009/0263097 A1 | 10/2009 | Solheid et al. |
| 2010/0008909 A1 | 1/2010 | Siadak et al. |
| 2010/0014813 A1 | 1/2010 | Ito et al. |
| 2010/0015834 A1 | 1/2010 | Siebens |
| 2010/0054680 A1 | 3/2010 | Lochkovic et al. |
| 2010/0092136 A1 | 4/2010 | Nehp |
| 2010/0172616 A1 | 7/2010 | Lu et al. |
| 2010/0197222 A1 | 8/2010 | Scheucher |
| 2010/0247053 A1 | 9/2010 | Cowen et al. |
| 2010/0272399 A1 | 10/2010 | Griffiths et al. |
| 2010/0303426 A1 | 12/2010 | Davis |
| 2010/0310213 A1 | 12/2010 | Lewallen et al. |
| 2011/0019964 A1 | 1/2011 | Nhep et al. |
| 2011/0108719 A1 | 5/2011 | Ford et al. |
| 2011/0164854 A1 | 7/2011 | Desard et al. |
| 2011/0222826 A1 | 9/2011 | Blackburn et al. |
| 2011/0299814 A1 | 12/2011 | Nakagawa |
| 2012/0008909 A1 | 1/2012 | Mertesdorf et al. |
| 2012/0106912 A1 | 5/2012 | McGranahan et al. |
| 2012/0251063 A1 | 10/2012 | Reagan et al. |
| 2012/0252244 A1 | 10/2012 | Elkins, II et al. |
| 2013/0034333 A1 | 2/2013 | Holmberg et al. |
| 2013/0109213 A1 | 5/2013 | Chang |
| 2014/0016902 A1 | 1/2014 | Pepe et al. |
| 2014/0050446 A1 | 2/2014 | Chang |
| 2014/0079356 A1 | 3/2014 | Pepin et al. |
| 2014/0133806 A1 | 5/2014 | Hill et al. |
| 2014/0133807 A1 | 5/2014 | Katoh |
| 2014/0161397 A1 | 6/2014 | Gallegos et al. |
| 2014/0205257 A1 | 7/2014 | Durrant et al. |
| 2014/0219622 A1 | 8/2014 | Coan et al. |
| 2014/0233896 A1 | 8/2014 | Ishigami et al. |
| 2014/0241671 A1 | 8/2014 | Koreeda et al. |
| 2014/0294395 A1 | 10/2014 | Waldron et al. |
| 2014/0328559 A1 | 11/2014 | Kobayashi et al. |
| 2014/0355936 A1 | 12/2014 | Bund et al. |
| 2015/0003788 A1 | 1/2015 | Chen et al. |
| 2015/0036982 A1 | 2/2015 | Nhep et al. |
| 2015/0144883 A1 | 5/2015 | Sendelweek |
| 2015/0185423 A1 | 7/2015 | Matsui et al. |
| 2015/0253528 A1 | 9/2015 | Corbille et al. |
| 2015/0268434 A1 | 9/2015 | Barnette, Jr. et al. |
| 2015/0316727 A1 | 11/2015 | Kondo et al. |
| 2015/0346436 A1 | 12/2015 | Pepe et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154186 A1 | 6/2016 | Gimblet et al. |
| 2016/0161688 A1 | 6/2016 | Nishimura |
| 2016/0161689 A1 | 6/2016 | Nishimura |
| 2016/0209599 A1 | 7/2016 | Van Baelen et al. |
| 2016/0246019 A1 | 8/2016 | Ishii et al. |
| 2016/0259133 A1 | 9/2016 | Kobayashi et al. |
| 2016/0306122 A1 | 10/2016 | Tong et al. |
| 2017/0038538 A1 | 2/2017 | Isenhour et al. |
| 2017/0131509 A1 | 5/2017 | Xiao et al. |
| 2017/0160492 A1 | 6/2017 | Lin et al. |
| 2017/0176690 A1* | 6/2017 | Bretz .................... G02B 6/3817 |
| 2017/0219782 A1 | 8/2017 | Nishimura |
| 2017/0254961 A1 | 9/2017 | Kamada et al. |
| 2017/0261699 A1 | 9/2017 | Compton et al. |
| 2017/0285279 A1 | 10/2017 | Daems et al. |
| 2018/0081127 A1 | 3/2018 | Coenegracht |
| 2019/0004251 A1* | 1/2019 | Dannoux .............. G02B 6/3841 |

(56) References Cited

U.S. PATENT DOCUMENTS

| | | | | |
|---|---|---|---|---|
| 2019/0004252 A1* | 1/2019 | Rosson | ............... | G02B 6/3831 |
| 2019/0004256 A1* | 1/2019 | Rosson | ............... | G02B 6/3887 |
| 2019/0004258 A1* | 1/2019 | Dannoux | ............ | G02B 6/3831 |

FOREIGN PATENT DOCUMENTS

| | | |
|---|---|---|
| CN | 1646962 A | 7/2005 |
| CN | 101195453 A | 6/2008 |
| CN | 201704194 U | 1/2011 |
| CN | 104064903 A | 9/2014 |
| DE | 3537684 A1 | 4/1987 |
| DE | 3737842 C1 | 9/1988 |
| DE | 19805554 A1 | 8/1998 |
| EP | 0 122 566 A2 | 10/1984 |
| EP | 0 130 513 A2 | 1/1985 |
| EP | 0 462 362 A2 | 12/1991 |
| EP | 0 547 778 A1 | 6/1993 |
| EP | 0 468 671 B1 | 1/1996 |
| EP | 0 762 171 A1 | 3/1997 |
| EP | 0 855 610 A2 | 7/1998 |
| EP | 0 856 761 A1 | 8/1998 |
| EP | 0 940 700 A2 | 9/1999 |
| EP | 0 949 522 A2 | 10/1999 |
| EP | 0 957 381 A1 | 11/1999 |
| EP | 0957381 A1 | 11/1999 |
| EP | 0 997 757 A2 | 5/2000 |
| EP | 1 065 542 A1 | 1/2001 |
| EP | 1 258 758 A2 | 11/2002 |
| EP | 1 391 762 A1 | 2/2004 |
| EP | 0 997 757 B1 | 9/2004 |
| EP | 1 122 566 B1 | 7/2005 |
| EP | 3 101 740 A1 | 12/2016 |
| EP | 3207223 A1 | 8/2017 |
| ES | 1184287 U | 5/2017 |
| GB | 2 022 284 A | 12/1979 |
| GB | 2 154 333 A | 9/1985 |
| GB | 2 169 094 A | 7/1986 |
| JP | S52-30447 A | 3/1977 |
| JP | S58-142308 A | 8/1983 |
| JP | S62-54204 A | 3/1987 |
| JP | 63-20111 U | 2/1988 |
| JP | S63-89421 A | 4/1988 |
| JP | 63-078908 U | 5/1988 |
| JP | H05-106765 A | 4/1993 |
| JP | H05-142439 A | 6/1993 |
| JP | 5297246 A | 11/1993 |
| JP | 07-318758 A | 12/1995 |
| JP | H08-050211 A | 2/1996 |
| JP | H08-054522 A | 2/1996 |
| JP | H08-062432 A | 3/1996 |
| JP | H08-292331 A | 11/1996 |
| JP | 09-049942 A | 2/1997 |
| JP | H09-135526 A | 5/1997 |
| JP | H09-159867 A | 6/1997 |
| JP | H09-203831 A | 8/1997 |
| JP | H09-325223 A | 12/1997 |
| JP | H09-325249 A | 12/1997 |
| JP | H10-170781 A | 6/1998 |
| JP | H10-332953 A | 12/1998 |
| JP | 11-064682 A | 3/1999 |
| JP | 11-119064 A | 4/1999 |
| JP | 11-248979 A | 9/1999 |
| JP | H11-271582 A | 10/1999 |
| JP | H11-281861 A | 10/1999 |
| JP | 11-326693 A | 11/1999 |
| JP | H11-337768 A | 12/1999 |
| JP | H11-352368 A | 12/1999 |
| JP | 2000-002828 A | 1/2000 |
| JP | 2001-116968 A | 4/2001 |
| JP | 2001-290051 A | 10/2001 |
| JP | 2002-520987 A | 7/2002 |
| JP | 2003-009331 A | 1/2003 |
| JP | 2003-070143 A | 3/2003 |
| JP | 2003-121699 A | 4/2003 |
| JP | 2003-177279 A | 6/2003 |
| JP | 2003-302561 A | 10/2003 |
| JP | 2004-361521 A | 12/2004 |
| JP | 2005-024789 A | 1/2005 |
| JP | 2005-031544 A | 2/2005 |
| JP | 2005-077591 A | 3/2005 |
| JP | 2005-114860 A | 4/2005 |
| JP | 2006-023502 A | 1/2006 |
| JP | 2006-146084 A | 6/2006 |
| JP | 2006259631 A | 9/2006 |
| JP | 2006-337637 A | 12/2006 |
| JP | 2007-078740 A | 3/2007 |
| JP | 2007-121859 A | 5/2007 |
| JP | 2008-191422 A | 8/2008 |
| JP | 2008-250360 A | 10/2008 |
| JP | 2009265208 | 11/2009 |
| JP | 2010-152084 A | 7/2010 |
| JP | 2010-191420 A | 9/2010 |
| JP | 2011-033698 A | 2/2011 |
| JP | 2013041089 A | 2/2013 |
| JP | 2013-156580 A | 8/2013 |
| JP | 2014-085474 A | 5/2014 |
| JP | 2014-095834 A | 5/2014 |
| JP | 2014-134746 A | 7/2014 |
| JP | 05537852 B2 | 7/2014 |
| JP | 05538328 B2 | 7/2014 |
| JP | 2014-157214 A | 8/2014 |
| JP | 2014-219441 A | 11/2014 |
| JP | 2015-125217 A | 7/2015 |
| JP | 2016-109816 A | 6/2016 |
| JP | 2016-109817 A | 6/2016 |
| JP | 2016-109819 A | 6/2016 |
| JP | 2016-156916 A | 9/2016 |
| JP | 3207223 U | 11/2016 |
| WO | 94/25885 A1 | 11/1994 |
| WO | 98/36304 A1 | 8/1998 |
| WO | 01/27660 A2 | 4/2001 |
| WO | 01/92937 A1 | 12/2001 |
| WO | 02/25340 A1 | 3/2002 |
| WO | 2006/113726 A1 | 10/2006 |
| WO | 2006/123777 A1 | 11/2006 |
| WO | 2012/037727 A1 | 3/2012 |
| WO | 2013177016 A1 | 11/2013 |
| WO | 2014/151259 A1 | 9/2014 |
| WO | 2014/167447 A1 | 10/2014 |
| WO | 2014/197894 A1 | 12/2014 |
| WO | 2015/144883 A1 | 10/2015 |
| WO | 2015197588 A1 | 12/2015 |
| WO | 2016/095213 A1 | 6/2016 |
| WO | 2016/156610 A1 | 10/2016 |
| WO | 2016/168389 A1 | 10/2016 |

OTHER PUBLICATIONS

International Search Report and Written Opinion received for International Patent Application Serial No. PCT/US2017/064095 dated Feb. 23, 2018, 16 pages.

International Search Report and Written Opinion received for International Patent Application Serial No. PCT/US2017/064087 dated Feb. 26, 2018, 14 pages.

International Search Report and Written Opinion received for International Patent Application Serial No. PCT/US2017/064077 dated Feb. 26, 2018, 15 pages.

International Search Report and Written Opinion received for International Patent Application Serial No. PCT/US2017/064084 dated Feb. 26, 2018, 16 pages.

International Search Report and Written Opinion received for International Patent Application Serial No. PCT/US2017/064093 dated Feb. 26, 2018, 13 pages.

International Search Report and Written Opinion received for International Patent Application Serial No. PCT/US2017/064096 dated Feb. 26, 2018, 12 pages.

International Search Report and Written Opinion received for International Patent Application Serial No. PCT/US2017/063938 dated May 14, 2018, 21 pages.

International Search Report and Written Opinion received for International Patent Application Serial No. PCT/US2017/063953 dated May 14, 2018, 21 pages.

(56) References Cited

OTHER PUBLICATIONS

International Search Report and Written Opinion received for International Patent Application Serial No. PCT/US2017/063991 dated May 14, 2018, 18 pages.
International Search Report and Written Opinion received for International Patent Application Serial No. PCT/US2017/064071 dated May 14, 2018, 24 pages.
International Search Report and Written Opinion received for International Patent Application Serial No. PCT/US2017/064072 dated May 14, 2018, 22 pages.
International Search Report and Written Opinion received for International Patent Application Serial No. PCT/US2017/064063 dated May 15, 2018, 22 pages.
International Search Report received for International Patent Application Serial No. PCT/US2018/040130 dated Sep. 18, 2018, 16 pages.
International Search Report received for International Patent Application Serial No. PCT/US2018/039019 dated Sep. 18, 2018, 15 pages.
International Search Report received for International Patent Application Serial No. PCT/US2018/039490 dated Oct. 4, 2018, 14 pages.
International Search Report received for International Patent Application Serial No. PCT/US2018/040011 dated Oct. 5, 2018, 15 pages.
International Search Report received for International Patent Application Serial No. PCT/US2018/040104 dated Oct. 9, 2018, 14 pages.
International Search Report received for International Patent Application Serial No. PCT/US2018/040126 dated Oct. 9, 2018, 18 pages.
International Search Report received for International Patent Application Serial No. PCT/US2018/039494 dated Oct. 11, 2018, 14 pages.
International Search Report pertaining to Application No. PCT/US2017/064063 dated May 15, 2018.
Search Report for International Application No. PCT/US2017/063862 dated Feb. 4, 2019.
Office Action for U.S. Appl. No. 16/019,008, filed Oct. 31, 2018.
Notice of Allowance for U.S. Appl. No. 16/018,997, filed Oct. 4, 2018.
Office Action for U.S. Appl. No. 16/018,988, filed Oct. 31, 2018.
Natawa, "Multimode and Single-Mode Fiber Connectors Technology"; IEEE Journal of Quantum Electronics, vol. QE-16, No. 6 Published Jun. 1980.
Fiber Systems International: Fiber Optic Solutions, "TFOCA-II 4-Channel Fiber Optic Connector", data sheet, 2 pgs.
Infolite, "Design and Data Specifications", 1 pg.
Schneier, Bruce, "Applied Cryptography", 1995 Sec. 10.3, 12.2.
Corning Cable Systems, "SST Figure-8 Drop Cables 1-12 Fibers", Preliminary Product Specifications, 11 pgs.
Corning Cable Systems, "SST-Drop (Dielectric) Cables 1-12 Fibers", Product Specifications, 2 pgs.
Corning Cable Systems, "SST-Drop (armor) Cables 1-12 Fibers", Product Specifications, 2 pgs.
Stratos: Lightwave, "Innovation Brought to Light", Hybrid HMA Series, Hybrid Multi Application, 2 pgs.
International Search Report pertaining to Application No. PCT/US2018/039020 dated Mar. 8, 2019.
Clearfield, "Fieldshield Optical Fiber Protection System: Installation Manual" for part No. 016164. Last Updated Dec. 2014. 37 pgs.
Clearfield, "FieldShield® SmarTerminal: Hardened Pushable Connectors" Last Updated Jun. 29, 2018, 2 pgs.
Cleartield, "FieldShield® SC and LC Pushable Connectors," Last Updated Jun. 1, 2018, 2 pgs.
Brown, "What is Transmission Welding?" Laser Plastic Welding website, 6 pgs, Retrieved on Dec. 7, 2018 from: http://www.laserplasticwelding.com/what-is-transmission-welding.
International Search Report and Written Opinion PCT/US2017/064027 dated Oct. 9, 2018.
Office Action Pertaining to U.S. Appl. No. 16/018,918 dated Sep. 28, 2018.
Office Action pertaining to U.S. Appl. No. 16/015,588 dated Jan. 24, 2019.

\* cited by examiner

FIBER OPTIC CONNECTORS AND CONNECTORIZATION EMPLOYING ADAPTER EXTENSIONS AND/OR FLEXURES

CROSS-REFERENCE TO RELATED APPLICATIONS

The present application is filed under 35 U.S.C. 111(a) as a continuation-in-part of International Patent Application No. PCT/US2017/064063, filed Nov. 30, 2017.

BACKGROUND

Field

The present disclosure relates generally to assemblies for interconnecting or otherwise terminating optical fibers and fiber optic cables in a manner suitable for mating with corresponding optical receptacles.

Technical Background

Optical fibers are used in an increasing number and variety of applications, such as a wide variety of telecommunications and data transmission applications. As a result, fiber optic networks include an ever increasing number of terminated optical fibers and fiber optic cables that can be conveniently and reliable mated with corresponding optical receptacles in the network. These terminated optical fibers and fiber optic cables are available in a variety of connectorized formats including, for example, hardened OptiTap® and OptiTip® connectors, field-installable UniCam® connectors, preconnectorized single or multi-fiber cable assemblies with SC, FC, or LC connectors, etc, all of which are available from Corning Incorporated, with similar products available from other manufacturers, as is well documented in the patent literature.

The optical receptacles with which the aforementioned terminated fibers and cables are coupled are commonly provided at optical network units (ONUs), network interface devices (NIDs), and other types of network devices or enclosures, and often require hardware that is sufficiently robust to be employed in a variety of environments under a variety of installation conditions. These conditions may be attributable to the environment in which the connectors are employed, or the habits of the technicians handling the hardware. Consequently, there is a continuing drive to enhance the robustness of these connectorized assemblies, while preserving quick, reliable, and trouble-free optical connection to the network.

BRIEF SUMMARY

According to the subject matter of the present disclosure, fiber optic connectors, connectorized cable assemblies, and methods for the connectorization of cable assemblies are provided. In accordance with a first variety of embodiments of the present disclosure, connectorized fiber optic cable assemblies are provided comprising a connector housing, a ferrule, a cable adapter, an adapter extension, a fiber optic cable, and a multi-diametrical sealing flexure. The connector housing comprises a ferrule retaining portion, an adapter seating portion, and a longitudinal axis extending through the ferrule retaining portion of the connector housing and the adapter seating portion of the connector housing. The ferrule is retained by the ferrule retaining portion of the connector housing and comprises an optical fiber bore. The cable adapter comprises an optical cable passageway, an optical fiber passageway, an extension securement portion, a housing insert portion seated in the adapter seating portion of the connector housing, and an adapter abutment positioned between the extension securement portion and the housing insert portion. The adapter extension is secured to the extension securement portion of the cable adapter and comprises an extended cable passageway. The fiber optic cable extends along the extended cable passageway of the adapter extension and the optical cable passageway of the cable adapter and comprises an optical fiber extending along optical fiber passageway of the cable adapter to the optical fiber bore of the ferrule. The multi-diametrical sealing flexure comprises a cable engaging portion engaging an outer cable surface of the fiber optic cable, a housing engaging portion engaging an outer housing surface of the connector housing, and an intermediate flexure portion extending from the cable engaging portion to the housing engaging portion and engaging an outer extension surface of the adapter extension.

In accordance with additional embodiments of the present disclosure, the adapter extension may be integrated with the cable adapter, e.g., as a unitary molded part.

In accordance with still further embodiments of the present disclosure, fiber optic connectors are provided comprising a connector housing, a ferrule, a cable adapter, and an adapter extension. The adapter extension is integrated with, or structurally configured to be secured to, the extension securement portion of the cable adapter and comprises an extended cable passageway. The adapter abutment and the connector housing are structurally configured to form an adapter sealing interface where the adapter abutment contacts an abutment facing surface of the connector housing. The adapter sealing interface forms a non-destructive flexural relief point along a length of the longitudinal axis. The adapter sealing interface originates at a housing-to-adapter elbow comprising an exposed anchoring face oriented towards the ferrule retaining portion of the connector housing.

In accordance with still further embodiments of the present disclosure, methods of connectorizing fiber optic cables are provided where a cable adapter is seated in the adapter seating portion of the connector housing with the adapter abutment limiting an extent to which the cable adapter extends into the adapter seating portion of the connector housing. The adapter extension is secured to the extension securement portion of the cable adapter and a fiber optic cable is extended along the extended cable passageway of the adapter extension and the optical cable passageway of the cable adapter. The fiber optic cable comprises an optical fiber extending along optical fiber passageway of the cable adapter to the optical fiber bore of the ferrule. An outer cable surface of the fiber optic cable, an outer housing surface of the connector housing, and an outer extension surface of the adapter extension are engaged with a multi-diametrical sealing flexure comprising a cable engaging portion, a housing engaging portion, and an intermediate flexure portion extending from the cable engaging portion to the housing engaging portion.

In accordance with additional embodiments of the present disclosure, connectorized fiber optic cable assemblies are provided comprising a multi-diametrical sealing flexure and a subcutaneous sealing element. The multi-diametrical sealing flexure comprises a cable engaging portion engaging an outer cable surface of the fiber optic cable and a housing engaging portion engaging an outer housing surface of the connector housing. The subcutaneous sealing element is positioned between an outer surface of the connector housing and an inner surface of the multi-diametrical sealing flexure to bound an entire rotational periphery of the connector housing about the longitudinal axis of the connector housing and form an annular projection in an outer surface of the multi-diametrical sealing flexure.

In accordance with alternative embodiments of the present disclosure, fiber optic connectors are provided comprising a connector housing and a cable adapter where the cable adapter comprises an optical cable passageway, an optical fiber passageway, a housing insert portion, an adhesive window, and an adapter abutment. The housing insert portion is structurally configured to be seated in the adapter seating portion of the connector housing to align the optical cable passageway and the optical fiber passageway with the longitudinal axis of the connector housing. The adhesive window resides in the housing insert portion in communication with the optical fiber passageway. The adapter abutment and the connector housing are structurally configured to form an adapter sealing interface where the adapter abutment contacts an abutment facing surface of the connector housing, and the cable adapter and the connector housing are structurally configured to form complementary keying surfaces that are positioned to align the adhesive injection port of the connector housing with the adhesive window of the cable adapter.

In accordance with further alternative embodiments of the present disclosure, connectorized fiber optic cable assemblies are provided comprising a connector housing, a ferrule, a cable adapter, and a fiber optic cable. The cable adapter comprises an adhesive window and the cable adapter and the connector housing are structurally configured to form complementary keying surfaces that are positioned to align the adhesive injection port of the connector housing with the adhesive window of the cable adapter. The optical fiber crosses the adhesive window of the cable adapter in a fiber potting portion of the optical fiber passageway of the cable adapter.

In accordance with still further alternative embodiments of the present disclosure, methods of connectorizing fiber optic cables are provided where the complementary keying surfaces formed by the cable adapter and the connector housing are aligned and the cable adapter is seated in the adapter seating portion of the connector housing to align the adhesive injection port of the connector housing with the adhesive window of the cable adapter. A fiber optic cable is extended along the optical cable passageway of the cable adapter and the longitudinal axis of the connector housing into the ferrule retaining portion of the connector housing such that the optical fiber crosses the adhesive window of the cable adapter in a fiber potting portion of the optical fiber passageway of the cable adapter. A ferrule is positioned along an end portion of the optical fiber and is retained in the ferrule retaining portion of the connector housing. An adhesive is injected through the adhesive injection port of the connector housing, into the adhesive window of the cable adapter to secure the cable adapter in the connector housing and the optical fiber in the cable adapter.

In accordance with additional alternative embodiments of the present disclosure, fiber optic connectors are provided comprising a connector housing and a cable adapter, where an interior surface of the connector housing and an exterior surface of the cable adapter form a capillary gap when the housing insert portion of the cable adapter is seated in the adapter seating portion of the connector housing. The the capillary gap is displaced from the longitudinal axis of the connector housing from the adapter sealing interface to an adhesive barrier formed by portions of the cable adapter and the connector housing when the housing insert portion of the cable adapter is seated in the adapter seating portion of the connector housing.

In accordance with further alternative embodiments of the present disclosure, a connector housing is provided comprising a ferrule retaining portion, a keying portion, a sealing element retaining portion, and an adhesive injection port where the adhesive injection port is defined in a potting portion of the connector housing and is separated from the ferrule retaining portion of the connector housing and the keying portion of the connector housing by the sealing element retaining portion of the connector housing, along the longitudinal axis of the connector housing.

Although the concepts of the present disclosure are described herein with reference to a set of drawings that show a particular type of fiber optic cable, and connector components of particular size and shape, it is contemplated that the concepts may be employed in any optical fiber connectorization scheme including, for example, and without limitation, hardened OptiTap® and OptiTip® connectors, field-installable UniCam® connectors, single or multi-fiber cable assemblies with SC, FC, LC, or multi-fiber connectors, etc.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 4A is an exploded view of selected components of FIG. 4;

DETAILED DESCRIPTION

Figure 1:
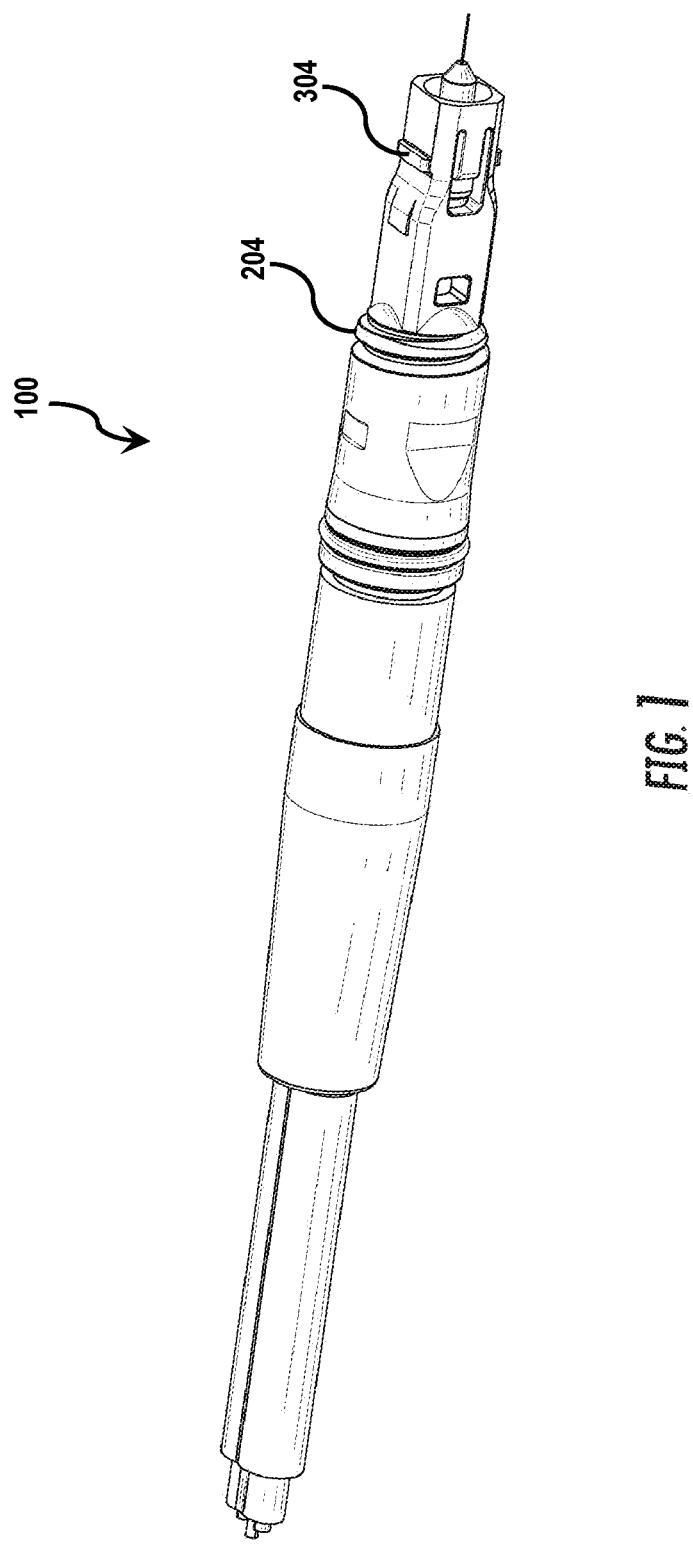
FIG. 1 illustrates a connectorized cable assembly according to one embodiment of the present disclosure.
Figure 2:
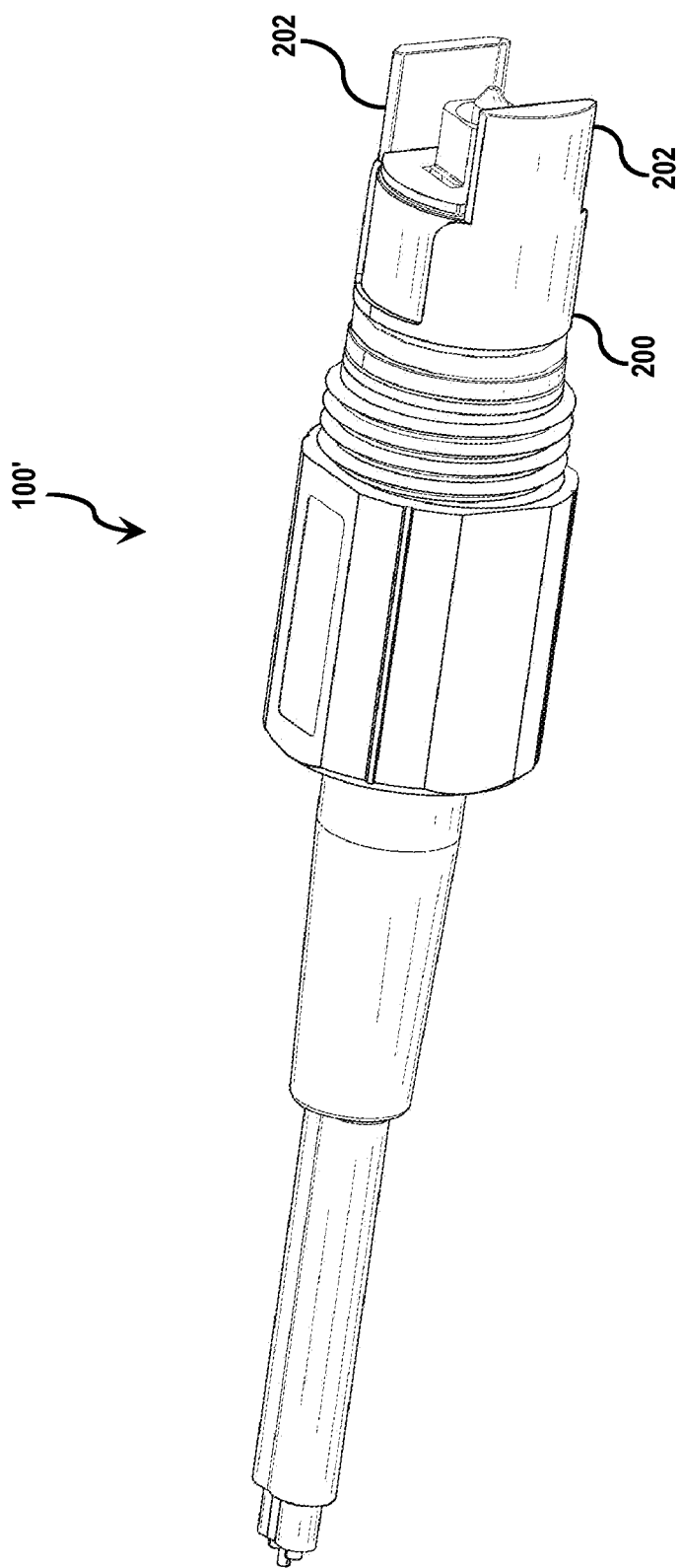
FIG. 2 illustrates a connectorized cable assembly employing a hardened OptiTap optical connector.
Figure 3:
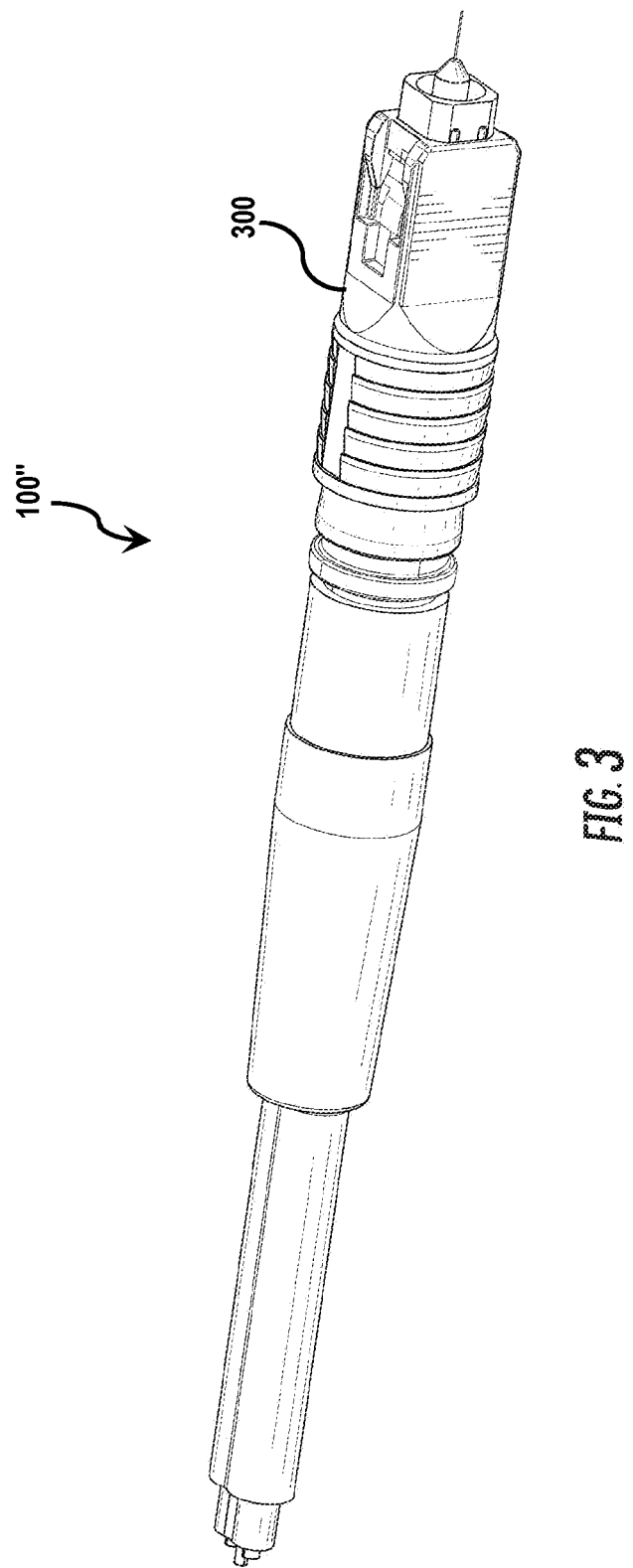
FIG. 3 illustrates a connectorized cable assembly employing a type SC optical connector.

Referring initially to FIGS. 1-3, as is noted above, the connectorization concepts of the present disclosure may be employed in a variety of optical fiber connectorization schemes including, for example, and without limitation, hardened OptiTap® and OptiTip® connectors, field-installable UniCam® connectors, single or multi-fiber cable assemblies with SC, FC, LC, or multi-fiber connectors, etc. To help illustrate this point, FIG. 1 illustrates a connectorized cable assembly 100 according to an embodiment of the present disclosure where the connectorized cable assembly defines a customized connectorization profile that is particularly well suited to interface with an optical connectorization terminal comprising a plurality of relatively closely packed connection ports.

Although the following description presents the concepts of the present disclosure in the context of the connectorized cable assembly 100 illustrated in FIG. 1, it is contemplated that the concepts of the present disclosure will enjoy equal applicability to any of a variety of cable assembly types. For example, and not by way of limitation, FIG. 2 illustrates a connectorized cable assembly 100' employing a conversion housing 200 for a hardened optical connector, one embodiment of which is available under the trade name OptiTap®. OptiTap® type conversion housings 200, and some other hardened connector conversion housings, will comprise a pair of opposing fingers 202 comprising opposing interior faces that extend parallel to, and are arranged symmetrically about, the longitudinal axis of the connector housing. The finger spacing between the opposing interior faces of the opposing fingers 202 is between 10.80 millimeters and 10.85 millimeters. finger depth along a direction parallel to the longitudinal axis of the connector housing is between 8.45 millimeters and 8.55 millimeters. The finger width along a direction perpendicular to the finger depth and the longitudinal axis of the connector housing is less than 10 millimeters. The outer faces of the opposing fingers lie along a common outside diameter of between 15.75 millimeters and 15.85 millimeters, and the outer face of one of the opposing fingers is truncated in a plane parallel to the opposing interior faces to define a truncated span extending from the outer face of the truncated opposing finger to the outer face of the opposite finger of between about 14.75 millimeters and about 14.95 millimeters. This truncation provides a keying functionality when the connector is paired with a connection port with complementary keying surfaces.

As a further non-limiting example, FIG. 3 illustrates a connectorized cable assembly 100" employing a type SC conversion housing 300. Type SC conversion housings are characterized by a connector footprint as set forth in IEC 61754-4, published by the International Electrical Commission, which defines the standard interface dimensions for the type SC family of fiber optic connectors and may be updated periodically. As is noted in the aforementioned standard, the parent connector for the type SC connector family is a single position plug connector which is characterized by a 2.5 millimeters nominal ferrule diameter. It includes a push-pull coupling mechanism which is spring loaded relative to the ferrule in the direction of the optical axis. The plug has a single male key which may be used to orient and limit the relative position between the connector and the component to which it is mated. The optical alignment mechanism of the connector is of a resilient sleeve style. IEC 61754-4 defines the standard interface dimensions of active device receptacles for the type SC connectors. The receptacles are used to retain the connector plug and mechanically maintain the optical datum target of the plugs at a defined position within the receptacle housings. The SC connector standard encompasses simplex plug connector interfaces, simplex adaptor connector interfaces, duplex plug connector interfaces, and duplex adaptor connector interfaces.

Figure 4:
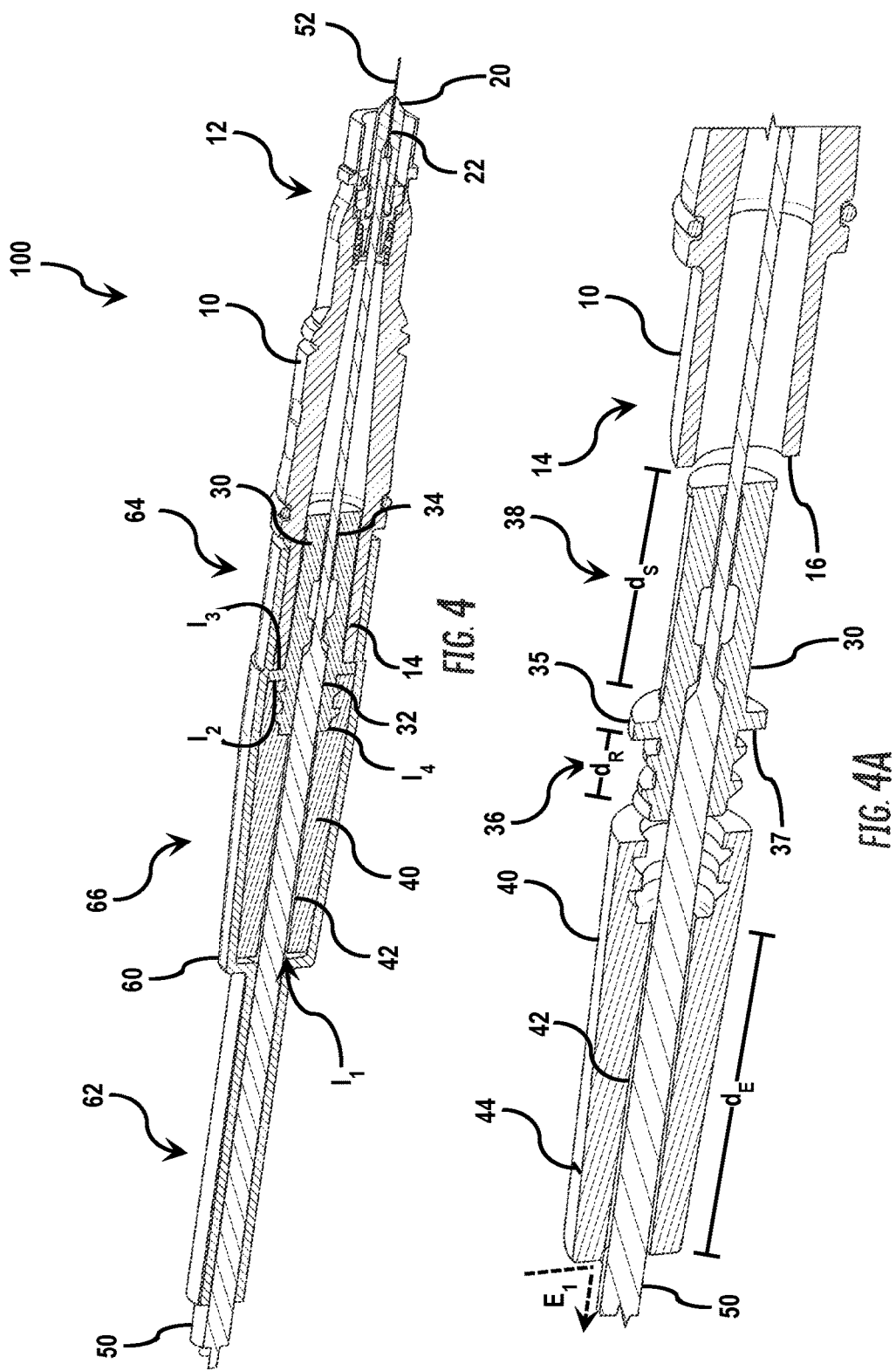
FIG. 4 is a cross-sectional illustration of the connectorized fiber optic cable assembly of FIG. 1.
Figure 6:
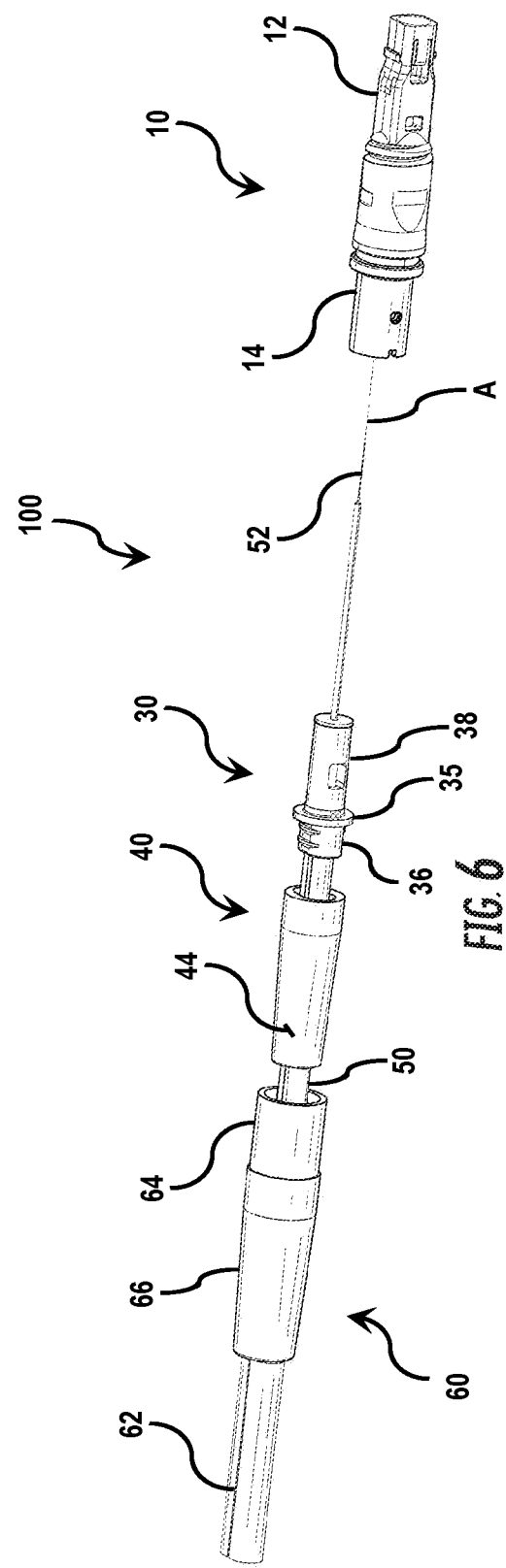
FIG. 6 is an alternative exploded view of selected components of FIG. 4.

Referring to FIG. 4, which is a cross-sectional illustration of the connectorized fiber optic cable assembly 100 of FIG. 1, to FIG. 4A, which is an exploded view of selected components of FIG. 4, and to FIG. 6, which is an alternative exploded view of selected components of the assembly 100, it is noted that the assembly 100 generally comprises a connector housing 10, an ferrule 20, a cable adapter 30, an adapter extension 40, a fiber optic cable 50 comprising an optical fiber 52, and a multi-diametrical sealing flexure 60. The connector housing 10, ferrule 20, cable adapter 30, adapter extension 40, and multi-diametrical sealing flexure 60 may be presented as respective single piece components, i.e., components that are fabricated from a single material and have a unitary compositional construction.

The connector housing 10 comprises a ferrule retaining portion 12, an adapter seating portion 14, and a longitudinal axis A that is obscured in FIGS. 4 and 4A but extends along the optical fiber 52 of the fiber optic cable 50, through the ferrule retaining portion 12 and the adapter seating portion 14 of the connector housing 10. The ferrule 20 is retained by the ferrule retaining portion 12 of the connector housing and comprises an optical fiber bore 22 that is aligned with the longitudinal axis A of the connector housing 10. For single fiber cables this alignment will be coaxial. For multifiber cables, this alignment will be orthogonally offset for one, more than one, or all of the optical fibers of the cable.

Figure 11:
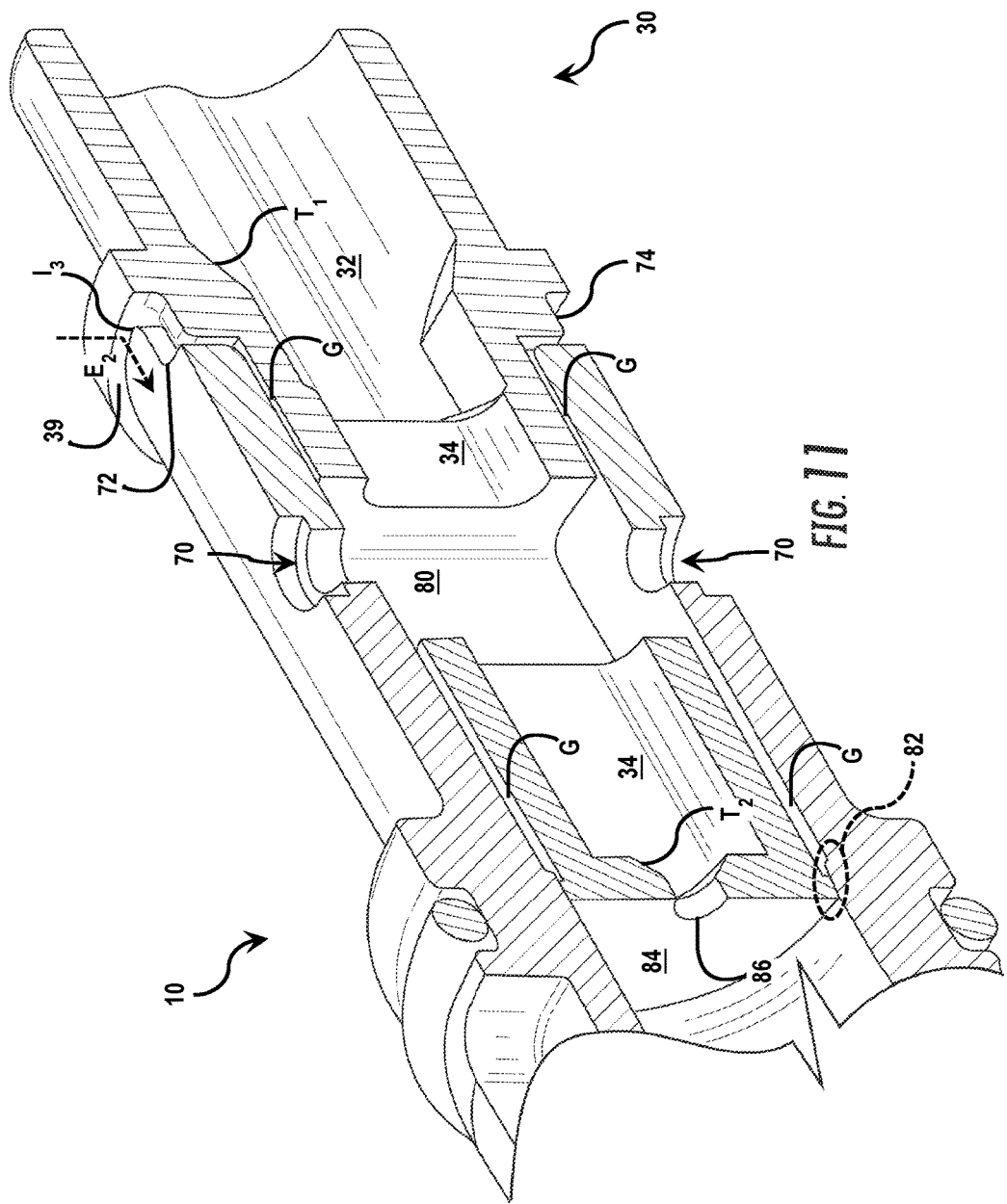
FIG. 11 illustrates the manner in which a cable adapter may interface with a connector housing according to embodiments of the present disclosure.

The cable adapter 30 comprises an optical cable passageway 32 and an optical fiber passageway 34, which are partially obscured in FIGS. 4 and 4A by the fiber optic cable 50, but are illustrated with further clarity in FIG. 11. The cable adapter 30 further comprises an extension securement portion 36, a housing insert portion 38 seated in the adapter seating portion 14 of the connector housing 10, and an adapter abutment 35. The adapter abutment 35, which functions as a stop surface, is positioned between the extension securement portion 36 and the housing insert portion 38 and serves to limit an extent to which the cable adapter 30 may extend into the adapter seating portion 14 of the connector housing 10.

Figure 9:
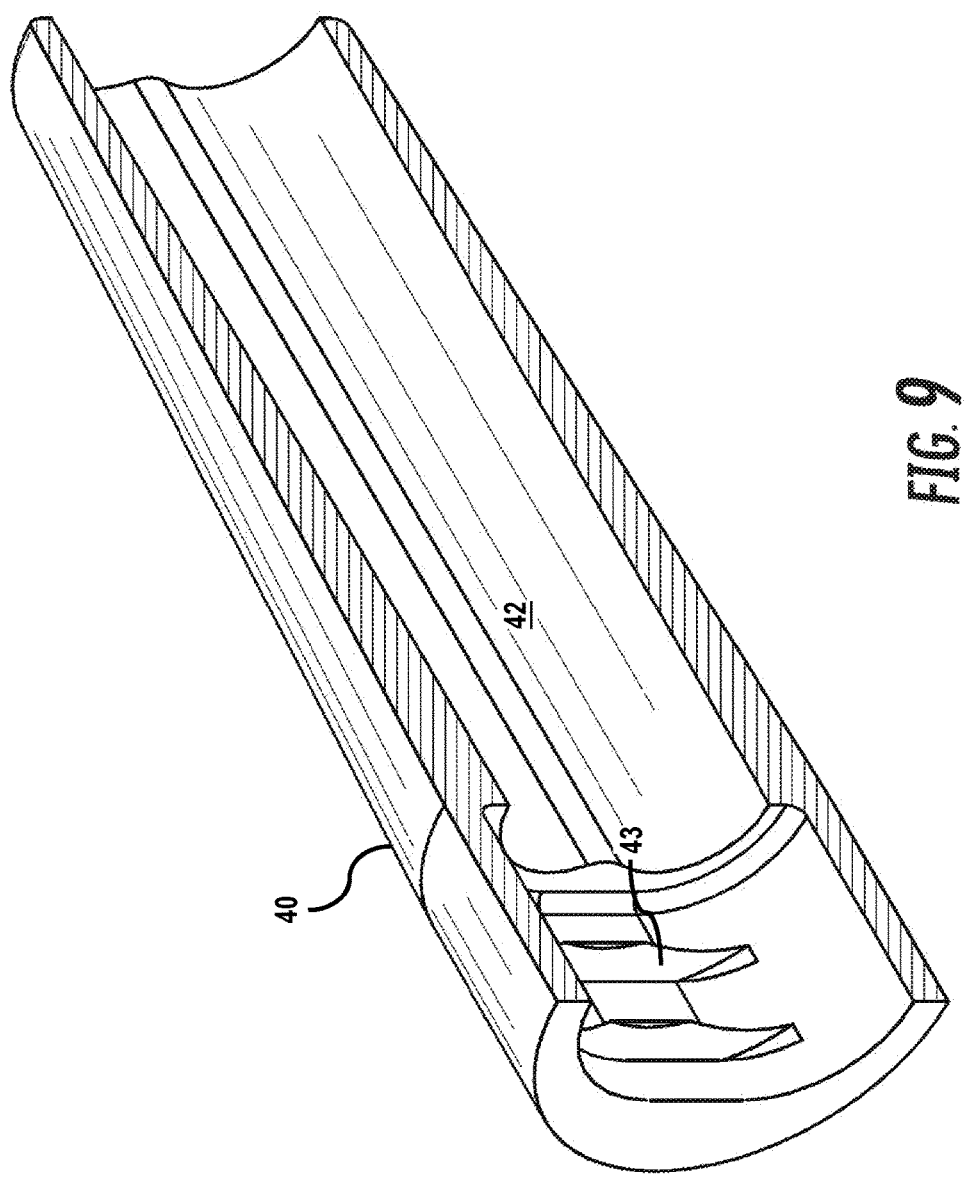
FIG. 9 illustrates an adapter extension according to embodiments of the present disclosure.

The adapter extension 40 is secured to the extension securement portion 36 of the cable adapter 30 and comprises an extended cable passageway 42, which is partially obscured in FIGS. 4 and 4A by the fiber optic cable 50, but is illustrated with further clarity in FIG. 9. The fiber optic cable 50 extends along the extended cable passageway 42 of the adapter extension 40 and the optical cable passageway 32 of the cable adapter 30. The optical fiber 52 of the fiber optic cable 50 extends along optical fiber passageway 34 of the cable adapter 30 to the optical fiber bore 22 of the ferrule 20.

The multi-diametrical sealing flexure 60 comprises a cable engaging portion 62 engaging an outer cable surface of the fiber optic cable, a housing engaging portion 64 engaging an outer housing surface of the connector housing, and an intermediate flexure portion 66 extending from the cable engaging portion 62 to the housing engaging portion 64 and engaging an outer extension surface 44 of the adapter extension 40.

Figure 5:
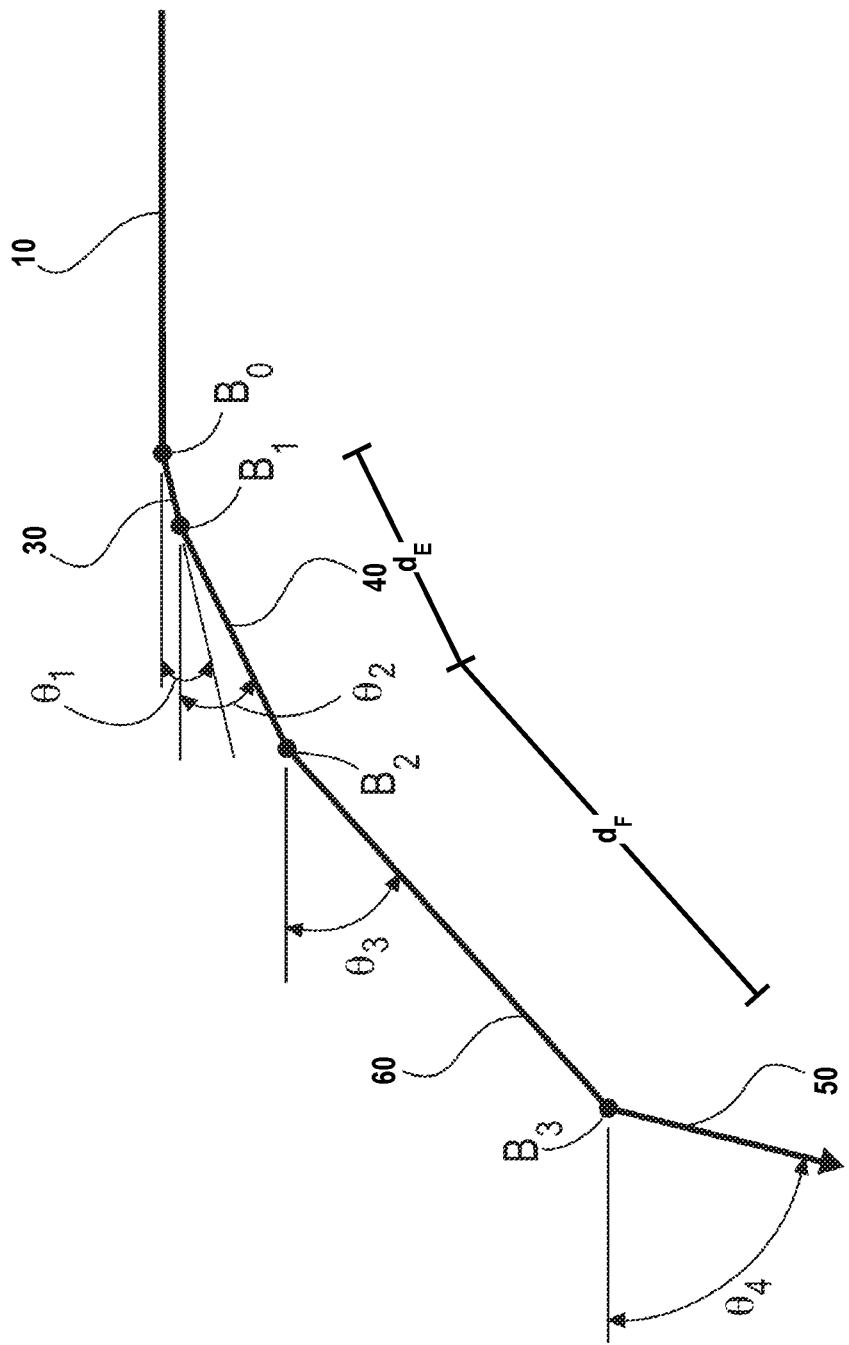
FIG. 5 is a schematic illustration of the multicomponent bending stiffness profile that may be presented by a fiber optic connector and a connectorized fiber optic cable assembly according to the present disclosure.

FIG. 5 is a schematic illustration of the multicomponent bending stiffness profile that may be presented by a fiber optic connector and a connectorized fiber optic cable assembly according to the present disclosure to protect the optical fiber 52 and other components of the fiber optic cable 50 from undue stress during installation and use. This bending stiffness profile and its respective component index values are conceptually related to the well-established concept of "flexural modulus," which can be used to characterize a material's ability to bend. Generally, stiffer connector components will yield less to bending forces than others and, as a result, generally higher bending index values can be associated with particular portions of such components. The bending index values B1, B2, B3, etc., recited herein are location-specific values that characterize the particular bending behavior of the connector at specific locations in the connector and will depend, for example, on the material forming the parts, the size and geometry of the parts, and the manner in which the parts cooperate with other parts in the connector assembly. For this reason, the bending index values B1, B2, B3, etc., are discussed herein in relative terms, with B1 being generally larger than B2, B2 being generally larger than B3, and B3 representing a degree of stiffness, or bend resistance, that may be greater than that of the fiber optic cable that is used with the optical fiber connector. In this manner, a connectorized fiber optic cable assembly may be constructed to present a degree of bend resistance that progresses from a relatively small value along the fiber optic cable itself, to progressively higher values as the cable extends farther and farther into the connector assembly of the cable. All bending index values and relative values disclosed herein are understood to be referenced at room temperature, which is defined herein as a temperature of between about 20° C. and bout 25° C.

More particularly, a particular bending index value $B_n$ at a specific free end location n on a connector part, refers to the bend resistance of the part at the free end, under a given non-destructive transverse fiber load F applied to the free end, and can be quantified by referring to the degree to which the free end deflects relative to an anchored portion of the connector assembly. Referring to the schematic illustration of FIG. 5, this relationship can be characterized by the following relation:

$$B_n = \frac{F}{\tan(\theta_n)}$$

where $\theta_n$ is the angle of deflection of the part at its free end, relative to an anchored portion of the connector assembly, and F represents the fiber load, in Newtons. In the context of connectorized cable assemblies, it is contemplated that some fiber optic cables will be so flexible that they do not support their own weight without bending, even when a relatively short length of cable is presented. In these cases, it may be said that the bending index value at a location along the cable will be very close to zero. At the opposite end of the spectrum lie highly rigid components, like connector housings, which may be characterized by nearly infinite bending index values under given non-destructive transverse loads.

It is contemplated that suitable transverse fiber loads F for establishing a particular bending index value $B_n$ will typically fall between about 10 N and about 50 N and can be considered non-destructive so long as it does not cause the cable adapter to deflect more than 45 degrees relative to connector housing, when the connector housing includes the anchored portion of the connector. Non-destructive transverse fiber loads F will also not be so great as to separate components of the connector from each other, damage components of the connector, or exceed the load limit of the connector port with which the connector is designed to cooperate.

Referring collectively to FIGS. 4, 4A, 5, and 6, a cable assembly 100 according to the present disclosure may comprise a multicomponent bending stiffness profile comprising a first bending index value B1 at a free end of the extension securement portion 36 of the cable adapter 30, a second bending index value B2 at a free end of the adapter extension 40, and a third bending index value B3 at a free end of the multi-diametrical sealing flexure 60, where B1>B2>B3. In one embodiment, B1>2(B2) and B2>2(B3), with B3 representing a degree of resistance to bending that is greater than that of the fiber optic cable. In many cases, the connector housing 10 will relatively rigid. For example, the multicomponent bending stiffness profile may further comprise a housing bending index B0 that is at least three times greater than the first bending index value B1.

The inherent stiffness of each of the various materials used to fabricate the fiber optic connectors and connectorized fiber optic cable assemblies according to the present disclosure may also play a significant role in protecting the optical fiber 52 and other components of the fiber optic cable 50 from undue stress during installation and use. For example, given a relatively rigid connector housing 10 characterized by a Young's modulus $E_H$, it is contemplated that the cable adapter 30 may be characterized by a Young's modulus $E_A$, which is less than $E_H$. Similarly, the adapter extension 40 may be characterized by a Young's modulus $E_E$, which is less than $E_A$. Finally, the multi-diametrical sealing flexure 60 may be characterized by a Young's modulus $E_F$, which is less than $E_E$. The resulting assembly will assume a bend profile not unlike that illustrated schematically in FIG. 5, under given transverse loads. In particular embodiments, the connector housing 10 and the cable adapter 30 are fabricated from Polyetherimide, Polyethersulfone, PEEK, or combinations thereof.

In particular embodiments, the adapter extension 40 is characterized by a Young's modulus of between about 80 MPa and about 500 MPa, and the multi-diametrical sealing flexure 60 is characterized by a Young's modulus of between about 30 MPa and about 80 MPa, at room temperature. In such embodiments, the connector housing 10 may be characterized by a Young's modulus of between about 2000 MPa and about 6000 MPa, and the cable adapter 30 may be characterized by a Young's modulus of between about 1500 MPa and about 6000 MPa, at room temperature.

As is illustrated schematically in FIG. 5, and referring to the components illustrated in FIGS. 4, 4A and 6, the cable assembly 100 may be described as comprising a first bending terminus B1 at a free end of the extension securement portion 36 of the cable adapter 30, a second bending terminus B2 at a free end of the adapter extension 40, and a third bending terminus B3 at a free end of the multi-diametrical sealing flexure 60. In this context, embodiments are contemplated where the free end of the adapter extension 40 is displaced from the free end of the extension securement portion of the cable adapter 30 along the longitudinal axis A by an effective extension length $d_E$ of at least about 15 centimeters, or by an effective extension length $d_E$ of between about 15 millimeters and about 30 millimeters. Similarly, the free end of the multi-diametrical sealing flexure 60 may be displaced from the free end of the adapter extension 40 by an effective flexure length $d_F$ of at least about 30 millimters, or by an effective flexure length $d_F$ of between about 30 millimeters and about 100 millimeters. In some implementations of the concepts of the present disclosure, it may be more preferable to refer to the following relation as a guide to designing the adapter extension 40 and the multi-diametrical sealing flexure 60:

$$1 \leq \frac{d_F}{d_E} \leq 4.$$

In other implementations of the concepts of the present disclosure, it may be more preferable to ensure that the effective extension length $d_E$ is at least about 10% of a length of a connectorized span of the cable assembly and that the effective flexure length $d_F$ is at least about 20% of a length of a connectorized span of the cable assembly.

Fiber optic connectors and connectorized fiber optic cable assemblies according to the present disclosure may be conveniently defined with reference to the various connector component interfaces embodied therein. These connector component interfaces may be presented at a variety of locations in an assembly and typically play a significant role in the integrity of the assembly because they provide non-destructive points of relief in the assembly under transverse loads. For example, referring to FIGS. 4 and 4A, a connectorized fiber optic cable assembly 100 according to the present disclosure may comprises a cable entry interface $I_1$, an adapter abutment interface $I_2$, and an adapter sealing interface $I_3$. The cable entry interface $I_1$ is formed by an inner surface of the extended cable passageway 42 of the adapter extension 40 and an outer surface of the fiber optic cable 50, where the fiber optic cable 50 extends into the extended cable passageway 42 of the adapter extension 40 towards the ferrule 20. The adapter abutment interface $I_2$ is formed by the adapter extension 40 and the adapter abutment 35 of the cable adapter 30, where the adapter extension 40 contacts an extension-facing surface 37 of the adapter abutment 35. The adapter sealing interface $I_3$ is formed by the adapter abutment 35 and the connector housing 10, where the adapter abutment 35 contacts an abutment facing surface 16 of the connector housing 10. The adapter abutment interface $I_2$ may be orthogonal to the longitudinal axis A of the connector housing 10. The adapter sealing interface $I_3$ originates at a housing-to-adapter elbow and may be orthogonal to the longitudinal axis A of the connector housing 10. The cable entry interface $I_1$ originates at a cable-to-connector elbow and may be oriented parallel to the longitudinal axis A of the connector housing 10, or otherwise be displaced from but extend in a common direction as the longitudinal axis A.

As is illustrated in FIG. 4, the multi-diametrical sealing flexure 60 forms respective strain relieving sealing bridges across each of these interfaces, i.e., by extending across the cable entry interface $I_1$, the adapter abutment interface $I_2$, and the adapter sealing interface $I_3$. More particularly, the cable entry interface $I_1$, the adapter abutment interface $I_2$, and the adapter sealing interface $I_3$ form respective non-destructive flexural relief points that are distributed along the length of the fiber optic connector formed by the connector housing 10, the ferrule 20, the cable adapter 30, and the adapter extension 40. The multi-diametrical sealing flexure 60 is sufficiently flexible to maintain a seal across these flexural relief points as the connectorized portion of the cable assembly 100 is subject to a transverse load, for example, a bend of at least about 90 degrees along the longitudinal axis of the connector.

Connectorized fiber optic cable assemblies according to the present disclosure may further comprise an adapter mounting interface $I_4$ formed by an inner surface of the extended cable passageway 42 of the adapter extension 40 and an outer surface of the extension securement portion 36 of the cable adapter 30, where the cable adapter 30 extends into the extended cable passageway 42 of the adapter extension 40, towards the cable entry interface $I_1$ of the adapter extension 40. In the illustrated embodiment, the adapter mounting interface $I_4$ is generally oriented parallel to the longitudinal axis A of the connector housing 10 but includes irregularities to enhance securement of the adapter extension 40 to the cable adapter 30.

Referring to FIG. 4, it is noteworthy that the aforementioned cable-to-connector and housing-to-adapter elbows, at which the cable entry interface $I_1$ and adapter sealing interface $I_3$ originate are oriented in opposite directions relative to the longitudinal axis A. More specifically, referring to FIG. 4A, the cable-to-connector elbow $E_1$ is oriented away from the ferrule retaining portion 12 of the connector housing 10, while, referring to FIG. 11, the housing-to-adapter elbow $E_2$ is oriented in the opposite direction. The housing-to-adapter elbow $E_2$ comprises an exposed anchoring face 39 on the adapter abutment 35 that is oriented towards the ferrule retaining portion 12 of the connector housing 10. The surface area of the exposed anchoring face 39 is, for example, at least about 5 square millieters to ensure that it is sufficiently large to help fix the multi-diametrical sealing flexure 60 in place about the connector housing 10, the adapter extension 40, and the fiber optic cable 50. For example, where the exposed anchoring face 39 is presented as a substantially continuous annulus with an inner radius of about 1.5 centimeters and an outer radius of about 1.75 centimeters, the exposed anchoring face 39 would have a surface area of about 2.5 square centimeters. The opposing elbows $E_1$, $E_2$ act to secure the multi-diametrical sealing flexure 60 in place along the longitudinal axis A as it forms respective sealing bridges across the cable-to-connector elbow $E_1$ and the oppositely directed housing-to-adapter elbow $E_2$.

Referring further to FIGS. 4, 4A, 6, and 11, it is noted that the optical fiber passageway 34 of the cable adapter 30 is positioned along the longitudinal axis A between the optical cable passageway 32 of the cable adapter 30 and the ferrule 20. The optical cable passageway 32 of the cable adapter 30 is larger than the optical fiber passageway 34 of the cable adapter 30 because it must additionally accommodate a unstripped cable, i.e., a cable including a jacket, while the optical fiber passageway merely needs to be large enough to accommodate a stripped cable.

As is illustrated in FIG. 4A, the housing insert portion 38 of the cable adapter 30 extends from the adapter abutment 35, along the longitudinal axis A, towards the ferrule 20 for a seated length $d_S$. The extension securement portion 36 of the cable adapter 30 extends from the adapter abutment 35 in an opposite direction along the longitudinal axis A for an extension receiving length $d_R$, where:

$$d_R < d_S.$$

The free end of the extension securement portion 36 of the cable adapter 30 is displaced from a free end of the adapter extension 40 along the longitudinal axis by an effective extension length $d_E$, where:

$$d_R < d_E.$$

In a variety of embodiments, it is contemplated that the extended cable passageway 42 of the adapter extension may be between about 15 and about 30 millimeters in length, and the adapter extension 40 may comprise a wall thickness that is between about 1 millimeter and about 4 millimeters, over a majority of the length of the extended cable passageway 42 of the adapter extension 40. In other embodiments, the extended cable passageway of the adapter extension 40 is at least about 15 centimeters in length and the adapter extension 40 comprises a wall thickness that is less than about 1 millimeter over a majority of the length of the extended cable passageway 42 of the adapter extension 40. In still further embodiments, the extended cable passageway 42 of the adapter extension is at least about 20% as long as a connectorized span of the cable assembly 100, or between about 10% and about 30% as long as a connectorized span of the cable assembly, excluding the multi-diametrical sealing flexure 60. In other embodiments, the cable engaging portion 62 of the multi-diametrical sealing flexure 60 is at least about 50% as long as the extended cable passageway 42 of the adapter extension 40, or between about 50% and about 400% as long as the extended cable passageway of the adapter extension.

The adapter extension 40 may be fabricated from a material that is characterized by a Young's modulus of between about 80 MPa and about 500 MPa, at room temperature. For example, the adapter extension 40 may be fabricated from a thermoplastic elastomer such as Hytrel® 8238. Reference herein to a component being "fabricated from" a material should be taken to mean that the material takes up at least a majority of the material volume of the part, and often the substantial entirety of the part.

Figure 7:
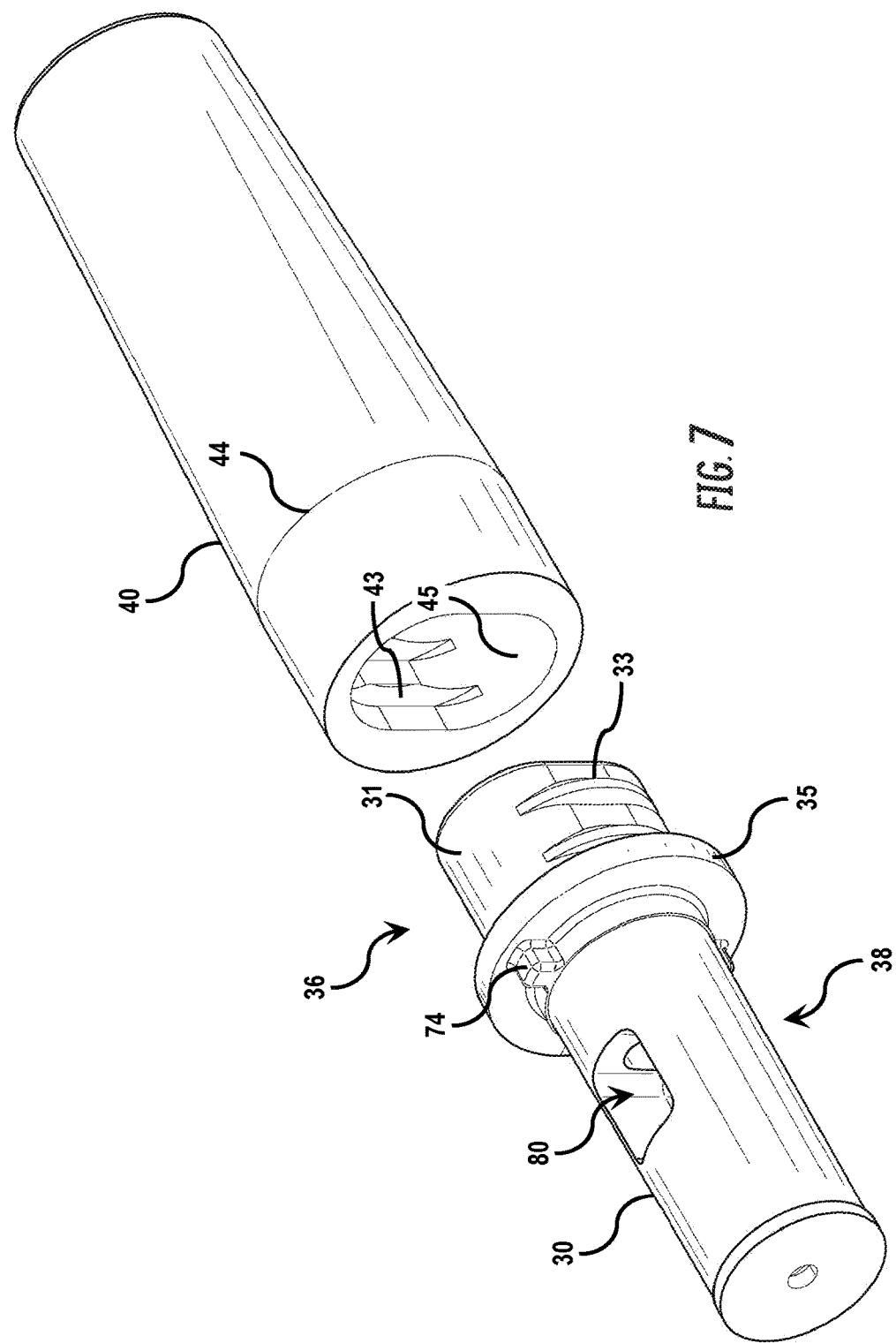
FIG. 7 illustrates a cable adapter and adapter extension according to embodiments of the present disclosure.
Figure 8:
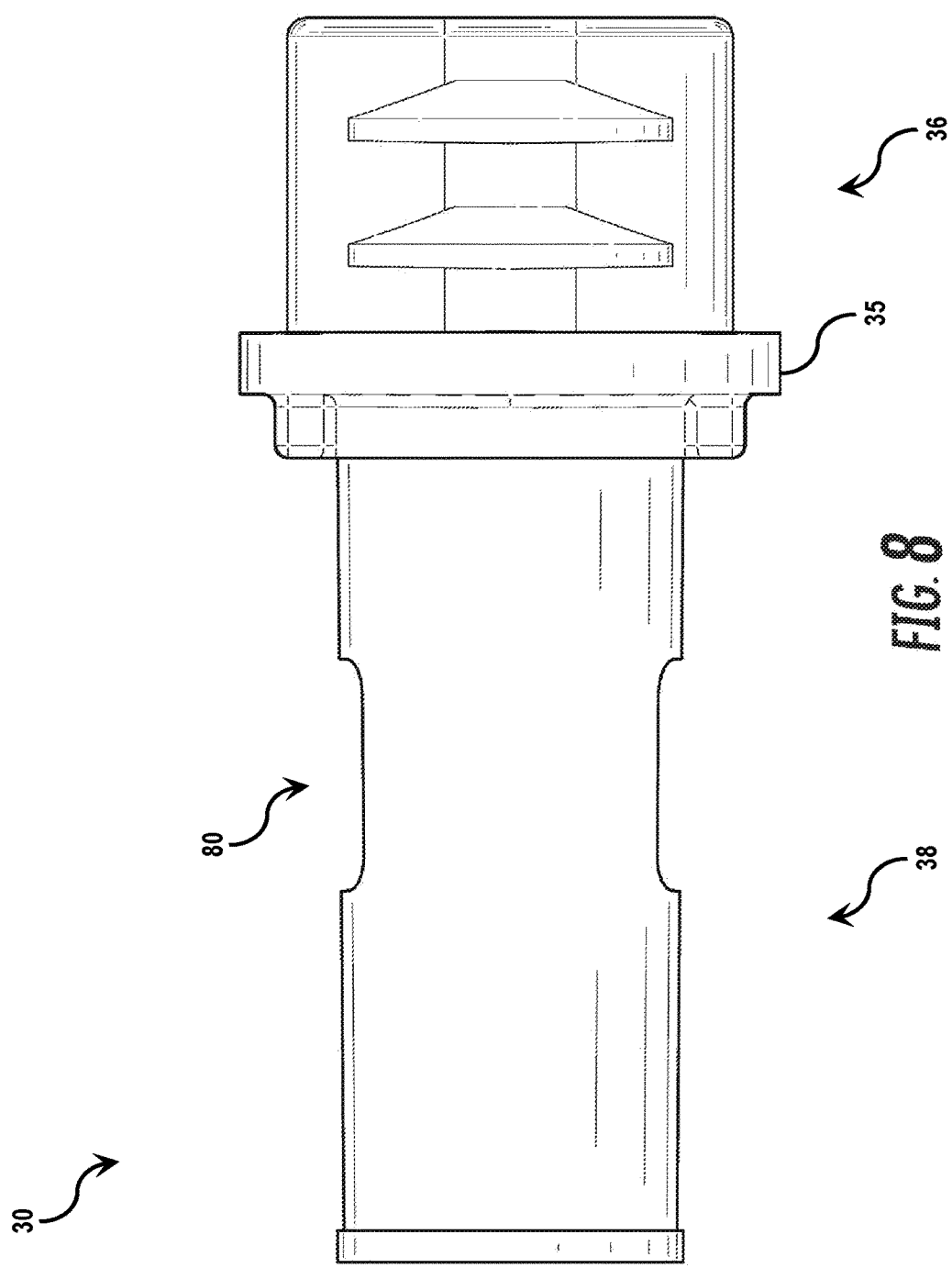
FIG. 8 illustrates a cable adapter according to embodiments of the present disclosure.

As is illustrated in FIG. 7, the adapter extension 40 may comprise an interior adapter-engaging surface 45 that is rotationally asymmetric relative to a longitudinal axis of the adapter extension 40, i.e., an axis that would extend along the longitudinal axis A of the connector housing 10 illustrated in FIG. 6. In which case, the extension securement portion 36 of the cable adapter 30 would comprise an exterior securement surface 31 that complements the rotational asymmetry of the interior adapter-engaging surface 45 of the adapter extension 40. This asymmetry helps to ensure that the adapter extension 40 and the fiber optic cable running there through, assume a proper rotational orientation relative to the cable adapter 30. To enhance securement, the interior adapter-engaging surface 45 of the adapter extension 40 and the exterior securement surface 31 of the extension securement portion 36 of the cable adapter 30 may comprise complementary locking projections 33 and locking recesses 43. In addition, the adapter extension 40 may comprise a rotationally symmetric an exterior surface 44 that spans a substantial entirety of the adapter extension 40 to enhance the ability of the adapter extension 40 to interface securely with the multi-diametrical sealing flexure 60.

It is contemplated that multi-diametrical sealing flexures according to the present disclosure may be characterized by a Young's modulus of between about 30 MPa and about 80 MPa, at room temperature. For example, and not by way of limitation, multi-diametrical sealing flexures may comprise a heat shrink tube, i.e., a tubular structure and suitable composition that may be shrunk about the remaining parts of the connectorized cable assembly at a temperature that is low enough to avoid heat related damage to the remaining parts of the connectorized cable assembly. For example, it is contemplated that suitable heat shrink tubing may comprise adhesive lined polyolefin 3:1 or 4:1 heat shrink tubing.

Referring to FIGS. 4 and 6, the cable engaging portion 62 of the multi-diametrical sealing flexure 60 may be between about 30 and about 100 millimeters in length and the multi-diametrical sealing flexure 60 may comprises a wall thickness that is less than about 1 millimeter, or between about 1 millimeters and about 4 millimeters, over a majority of the length of the cable engaging portion 62 of the multi-diametrical sealing flexure 60. In some embodiments, the cable engaging portion 62 of the multi-diametrical sealing flexure is at least about 20% as long as a connectorized span of the cable assembly 100.

The adapter 30 and adapter extension 40 are illustrated in FIGS. 4, 4A, 6, and 7 as two separate components that are secured to each other. It is also contemplated that the adapter extension 40 may be integrated with the cable adapter 30 as a single component, in which case it would be preferable to fabricate the unitary component such that the portion forming the adapter extension 40 is made from a material characterized by a Young's modulus $E_E$ that would be less than the Young's modulus $E_A$ of the portion forming the cable adapter 30. For example, the adapter 30 and adapter extension 40 may be fabricated as a unitary molded part.

Figure 10:
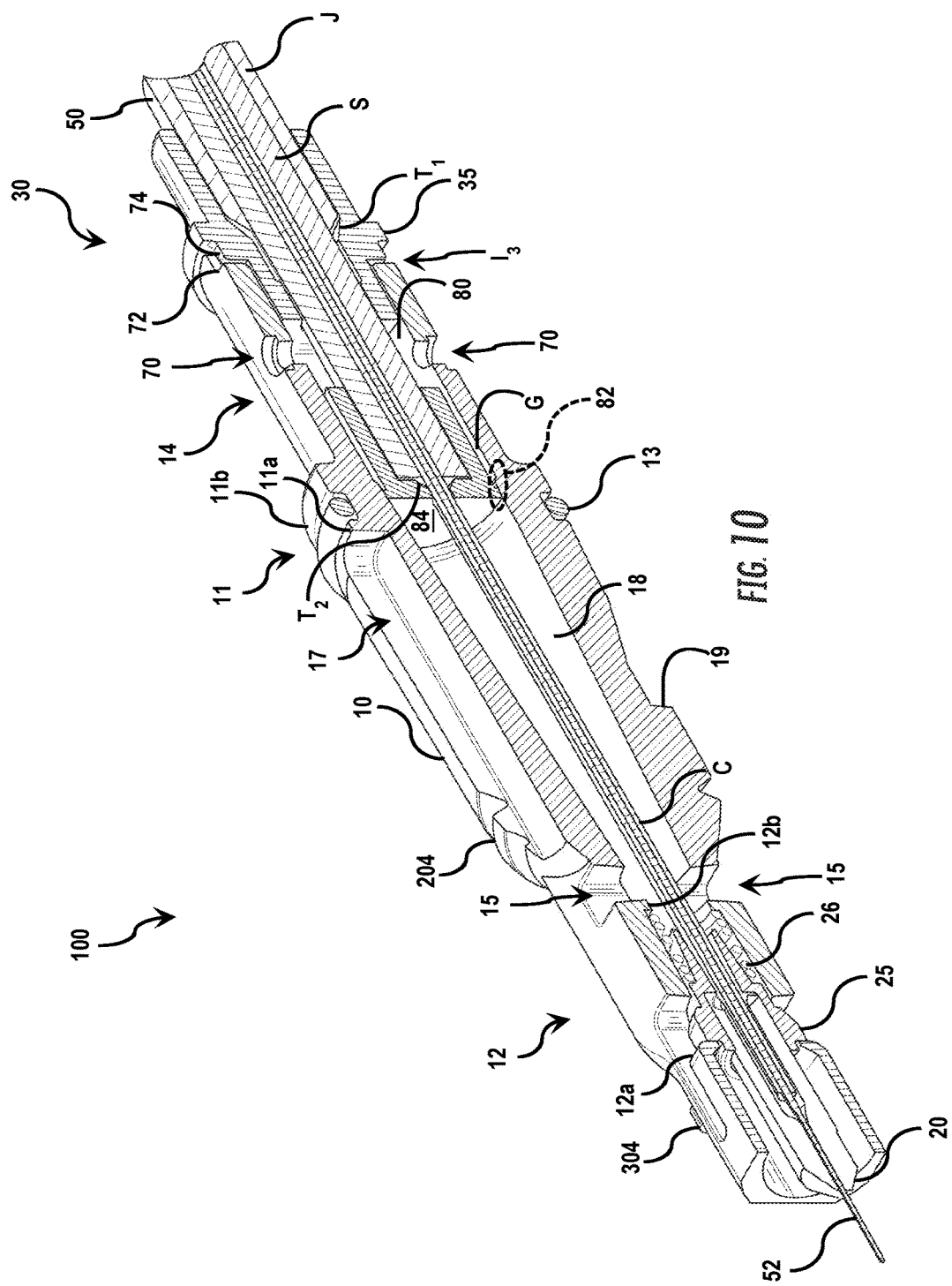
FIG. 10 illustrates a portion of a connectorized cable assembly according to embodiments of the present disclosure.

Referring to FIGS. 7, 8, 10, and 11, where like elements are denoted with like reference numerals, particular embodiments of the present disclosure relate specifically to the use of adhesives in connectorization, to the features of the cable adapter 30 and the adapter seating portion 14 of the connector housing 10, and the manner in which these features cooperate to facilitate effective connectorization of a fiber optic cable assembly. FIG. 10 illustrates the connectorized fiber optic cable assembly 100 of FIG. 1 from a different perspective, and without a multi-diametrical sealing flexure, to help clarify the nature of particular components of the assembly. More specifically, in FIG. 10, the fiber optic connector portion of the cable assembly 100 comprises a connector housing 10 with a ferrule retaining portion 12 and an adapter seating portion 14, as is described above. FIG. 10 also shows adhesive injection ports 70 in the adapter seating portion 14 of the connector housing 10, which ports extend through the wall of the connector housing 10, i.e., from an outer surface of the connector housing 10 to an inner surface of the connector housing 10, and permit the pressurized or non-pressurized introduction of adhesive into an interior potting cavity of the connector housing 10.

Referring specifically to FIGS. 10 and 11, as is noted above, the cable adapter comprises an optical cable passageway 32, an optical fiber passageway 34, and a housing insert portion 38 that is structurally configured to be seated in the adapter seating portion 14 of the connector housing 10. The optical cable passageway 32 of the cable adapter 30 is preferably large enough to accommodate a jacketed portion J of a fiber optic cable 50. The optical fiber passageway 34 of the cable adapter 30 is smaller than the optical cable passageway 32 and is large enough to accommodate a coated and/or buffered optical fiber C and any longitudinal strength members S running with the coated optical fiber C. In this context, the optical cable passageway 32 may be provided with a stripped cable transition $T_1$ to a reduced interior cross section that is large enough to accommodate a stripped optical cable. Similarly, the optical fiber passageway 34 may be provided with an optical fiber transition $T_2$ to a reduced interior cross section comprising an optical fiber port that is large enough to accommodate a coated optical fiber.

It is contemplated that the above-noted cable adapter passageways can be sized and shaped to accommodate a variety of fiber optic cables including, for example, a single fiber cable of the type illustrated in FIG. 10. In one embodiment, for a coated optical fiber having an OD of about 900 μm (micrometers), the optical fiber aperture of the cable adapter will have an ID of about 950 μm, to provide about 50 μm of free space about the coated optical fiber. Similarly, the optical fiber passageway will be large enough to provide up to about 200 μm of free space about the optical fiber and associated strength members. The reduced interior cross section of the optical cable passageway will be large enough to provide up to about 300 μm of free space about the stripped cable portion, and the larger portion of the optical cable passageway will provide up to about 300 μm of free space about the jacketed fiber optic cable.

FIG. 10 also illustrates the provision of a pair of opposed fiber clamping windows 15 in the connector housing 10. These clamping windows 15 provide a clear path to the coated/buffered portion C of the optical fiber 52 inside the connector housing 10, between the fiber buckling chamber 18 and the ferrule retaining portion 12 of the connector housing 10 to facilitate fiber clamping during ferrule or ferrule holder installation. More specifically, the optical fiber 52 may be clamped in a suitable manner through these opposing windows 15 as the ferrule 20 and/or ferrule holder 25 is inserted into housing and installed on the end of the optical fiber 52. Clamping the optical fiber 52 in this manner helps prevent the optical fiber 52 from being pushed rearward or buckling as the ferrule 20 and/or ferrule holder 25 is installed.

Figure 12:
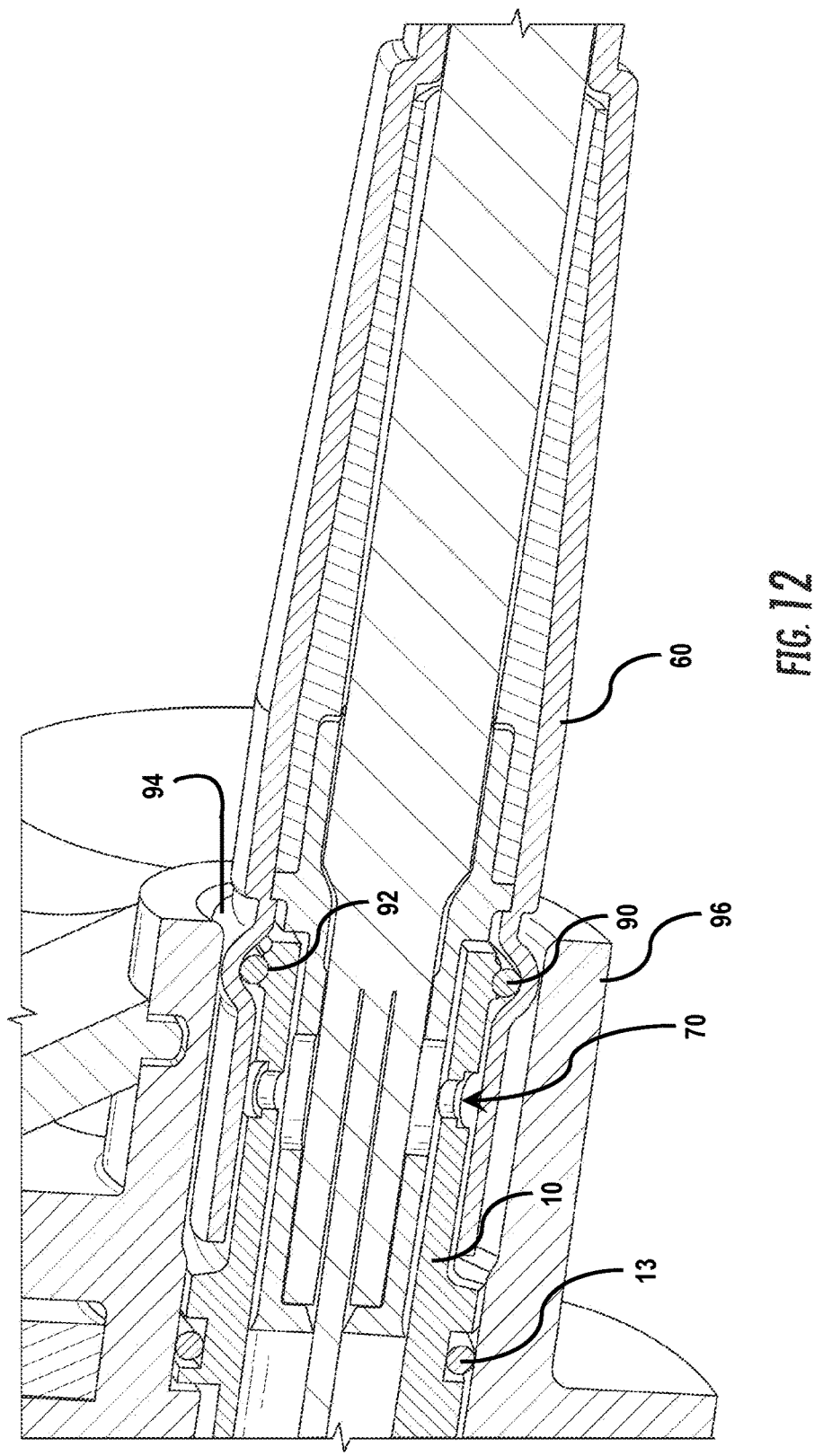
FIG. 12 illustrates the use of a subcutaneous sealing element in a connectorized cable assembly of the present disclosure.

FIG. 12 illustrates the provision of a subcutaneous sealing element 90 between an outer surface of the connector housing 10 and an inner surface of the multi-diametrical sealing flexure 60. The subcutaneous sealing element 90 may be presented as an O-ring or other type of sealing element, may bound an entire rotational periphery of the connector housing 10 about the longitudinal axis A of the connector housing 10, and may cooperate with the multi-diametrical sealing flexure 60 to form an annular projection 94 in an outer surface of the multi-diametrical sealing flexure 60. The outer surface of the connector housing 10 may be provided with a seal accommodating groove 92 may be formed in the outer surface of the connector housing 10 to receive and secure the subcutaneous sealing element 90 beneath the multi-diametrical sealing flexure 60. As is illustrated in FIG. 12, this sealing element 90 can be used to create a continuous, sealed interference fit between the connectorized portion of the cable assembly and the port structure 96 with which it is to be coupled to keep dirt and debris from lodging in the circumferential gap between the connector and the port.

FIGS. 7, 8, 10, and 11 most clearly show an adhesive window 80 in the housing insert portion 38 of the cable adapter 30. This adhesive window 80 communicates with the optical fiber passageway 34 of the cable adapter 30 to provide a path for injecting an adhesive through one or both of the adhesive injection port 70, into the adhesive window 80, to secure the cable adapter 30 in the connector housing 10 and to secure the optical fiber 52, and any associated cable components in the housing insert portion 38 of the cable adapter 30.

The adhesive window 80 should be large enough to provide clearance for adhesive introduced into one or both of the injection ports 70 to pass across at least a portion of the optical fiber passageway 34 of the cable adapter 30 when a stripped portion of a fiber optic cable 50 extends along the optical fiber passageway 34. In particular embodiments, including the illustrated embodiment, the adhesive window 80 extends across the entirety, or at least a majority, of the cable adapter 30 in a crossing direction that is orthogonal to the optical fiber passageway 34 of the cable adapter 30. The adhesive window 80 also extends orthogonally to the crossing direction and the optical fiber passageway 34 to a lateral depth that is large enough to reduce the outer wall thickness of the cable adapter 30. This enlarges a portion the optical fiber passageway 34 to form a fiber potting portion in the optical fiber passageway 34 where a substantial amount of adhesive can be held and cured to secure the optical fiber 52 and any associated cable components in the expanded space, in the cable adapter 30. In particular embodiments, it is contemplated that the lateral depth reduces the outer wall thickness of the cable adapter 30 in the fiber potting portion of the optical fiber passageway 34 by between about 0.3 millimeters and about 0.8 millimeters.

To facilitate the aforementioned pressurized or non-pressurized adhesive injection, the cable adapter 30 and the connector housing 10 can be structurally configured to form complementary keying surfaces that are positioned to align the adhesive injection ports 70 of the connector housing 10 with the adhesive window 80 of the cable adapter 30. More specifically, complementary keying surfaces may be formed where the adapter abutment 35 contacts the abutment facing surface 16 of the connector housing by, for example, providing a keyed cut-out 72 in the connector housing 10 and a keyed projection 74 in the cable adapter 30.

FIG. 11 and, to some extent, FIG. 10 show how an interior surface of the connector housing 10 and an exterior surface of the cable adapter 30 can be fashioned to form a capillary gap G when the housing insert portion 38 of the cable adapter 30 is seated in the adapter seating portion 14 of the connector housing 10. This capillary gap G is illustrated in FIGS. 10 and 11 as an annular gap that is interrupted by the adhesive injection ports 70 of the connector housing 10 and the adhesive window 80 of the cable adapter 30. Even if the capillary gap G is not an annular gap, it may be displaced from and extend parallel to the longitudinal axis of the connector housing 10, which runs coaxially with the core of the optical fiber 52.

In the illustrated embodiment, the capillary gap G is formed between an expanded inner dimension of the connector housing 10 and a restricted outer dimension of the cable adapter 30. It is, however, contemplated that a suitable capillary gap G may be formed by merely restricting the inner dimension of the connector housing 10 or the outer dimension of the cable adapter 30. Although the preferred size of the capillary gap will be dependent on the particular adhesive in use, it is contemplated that suitable gap spacings will, in many case, be less than about 0.15 millimeters for a majority of the extent of the gap, or between about 0.1 millimeters and about 0.3 millimeters for a majority of the extent of the gap. Preferred gap lengths will also depend on the particular adhesive in use, but it is contemplated that a suitable gaps will extend at least about 3 millimeters, or between about 3 millimeters and about 15 millimeters, parallel to the longitudinal axis.

Regardless of whether connectorized fiber optic cable assemblies according to the present disclosure utilize a capillary gap G, it is noted that, for optimum adhesion, an adhesive should thoroughly "wet out" the surfaces of the connector assembly to be bonded. In other words, the adhesive should flow and cover the surfaces to maximize the contact area and the attractive forces between the adhesive and bonding surfaces. Lower surface energy materials tend to spontaneously wet out higher energy surfaces. For a liquid adhesive to effectively wet out a surface, the surface energy of the adhesive should be as low, or lower than, the surface energy of the surfaces of the substrates to be bonded. If the liquid surface energy is significantly above that of the substrate surface, the substrate does not wet as well. Substrates to be bonded may be fabricated from materials, like ABS plastics, having relatively high surface energies. Alternatively, the surface of a relatively low surface energy material, like polypropylene or polyethylene, may be treated to increase the surface energy by, for example, exposing the surface to UV light, etching the surface, and/or treating the surface with a solvent.

Referring further to FIGS. 10 and 11, in the illustrated embodiment, the capillary gap G is displaced from and extends parallel to the longitudinal axis of the connector housing from the adapter sealing interface $I_3$ to an adhesive barrier 82 formed by portions of the cable adapter 30 and the connector housing 10 when the housing insert portion 38 of the cable adapter 30 is seated in the adapter seating portion 14 of the connector housing 10. The adhesive barrier can be positioned between the capillary gap G and the ferrule retaining portion 12 of the connector housing, between the capillary gap G and a fiber buckling chamber 18 of the connector housing 10, or both, to help preserve the integrity of the optical coupling at the ferrule 20.

For annular capillary gaps G, this adhesive barrier 82 is also annular. The adhesive barrier 82 can be formed at a press-fit engagement interface between respective surfaces of the cable adapter 30 and the connector housing 10. This type of press-fit engagement can be facilitated by restricting the inner dimension of the connector housing, expanding the outer dimension of the cable adapter, or both.

The adhesive injection ports 70 and the adhesive window 80 can be positioned between the adapter sealing interface $I_3$ and the adhesive barrier 82 to help facilitate uniform distribution of the injected adhesive.

To maintain the integrity of the adhesive barrier 82 and permit passage of the optical fiber 52, the cable adapter 30 also comprises a fiber admitting face 84 extending across an interior dimension of the annular adhesive barrier 82 and comprising an optical fiber aperture 86. The optical fiber aperture 86 is designed to closely approximate the size and shape of the external profile of the optical fiber portion of the connectorized optical cable. For example, and not by way of limitation, for single fiber cables, the optical fiber aperture will have a diameter of between about 250 µm and about 1 millimeters, depending on whether the fiber is coated and/or buffered. The adapter sealing interface $I_3$, the adhesive barrier 82, and the fiber admitting face 84 collectively form a closed end of the connector housing when the cable adapter 30 is seated in the adapter seating portion 14 of the connector housing 10.

To help facilitate uniform adhesive injection through one or both of the adhesive injection ports 70, the connector housing 10 may be provided with a relief port in the adapter seating portion 14 of the connector housing 10. In one embodiment, adhesive is injected through only one of the injection ports 70 and the remaining injection port serves as the relief port-allowing air inside the connector assembly to escape when adhesive is injected. In another embodiment, the relief port is provided along a portion of the adapter sealing interface $I_3$, for example by providing relief gaps between the keyed cut-out 72 and the keyed projection 74.

Referring to FIGS. 10 and 12, in particular embodiments of the present disclosure, it is contemplated that the adhesive injection ports 70 of the connector housing 10 may be positioned to ensure that any excess adhesive or other surface irregularities created on the outer surface of the connector housing 10 when adhesive is injected into an interior potting cavity of the connector housing 10 through the adhesive injection ports 70 will not interfere with the keying or sealing functionality of the connectorized cable assembly 100 when it is engaged with a suitable port structure 96. It may also be advantageous to ensure that the adhesive injection ports 70 are positioned to prevent adhesive interference with the ferrule retaining portion 12 of the connector housing 10, and the ferrule 20, ferrule holder 25, and ferrule retention spring 26 incorporated therein. It may be further advantageous to ensure that the adhesive injection ports 70 are positioned to prevent adhesive interference with conversion housing engagement features, in embodiments where such features are provided on the connector housing 10. This positioning can be significant in embodiments of the present disclosure that utilize a cable adapter 30, and embodiments of the present disclosure where a cable adapter 30 and an adapter extension 40 are not needed.

More specifically, referring to FIGS. 10 and 12, the connector housing comprises ferrule retention features 12a, 12b in the ferrule retaining portion 12 of the connector housing, a keying feature 17 defined as a longitudinally oriented cut-out on an outer surface of the connector housing 10 in a keying portion of the connector housing, and sealing element retaining features 11a, 11b defined on the outer surface of the connector housing 10 in a sealing element retaining portion of the connector housing. The keying portion of the connector housing 10 is structurally configured to inhibit rotation of the connector housing 10 about the longitudinal axis when the housing 10 is engaged with a complementary keying portion of the port structure 96. The sealing element retention features 11a, 11b are structurally configured to help retain a sealing element 13 therein. The sealing element 13 may, for example, comprise an O-ring, and is designed to cooperate with an inner surface of the port structure 96 to help create a sealed engagement with the port structure 96 in the manner illustrated in FIG. 12.

The adhesive injection ports 70 are defined in a potting portion of the connector housing and extend from the outer surface of the connector housing 10 to an inner surface of the connector housing 10 to communicate with an interior potting cavity of the connector housing 10. In this embodiment, the adhesive injection ports 70 are positioned rearwardly of the ferrule retaining portion 12, the keying feature 17, and the sealing element retention features 11a, 11b. Stated differently, the adhesive injection ports 70 are separated from the ferrule retaining portion 12 of the connector housing 10 and the keying portion of the connector housing 10 by the sealing element retaining portion of the connector housing 10, along the longitudinal axis of the connector housing 10.

In particular embodiments, the connector housing 10 may further comprises a locking portion comprising a locking feature 19 that is defined on the outer surface of the connector housing 10 and is designed to inhibit axial movement of the connector housing 10 along a retracting direction of the fiber optic connector when the connectorized cable assembly 100 is engaged with a complementary securing member of a complementary port structure 96. In these embodiments, the adhesive injection ports 70 will be separated from the locking portion of the connector housing by the sealing element retaining portion of the connector housing 10, along the longitudinal axis of the connector housing 10, to help ensure that any excess adhesive or other surface irregularities created on the outer surface of the connector housing 10 when adhesive is injected into the interior potting cavity of the connector housing 10 through the adhesive injection ports 70 will not interfere with the locking functionality of the locking feature 19.

Referring to FIGS. 1-3, in addition to FIGS. 10 and 12, in further embodiments of the present disclosure, the connector housing 10 may comprise conversion housing engagement features. For example, the connector housing 10 may comprise a first type of engagement feature 204, in the form of an external threaded portion on the conversion housing 10, for interfacing with a complementary threaded portion of hardened conversion housing 200. The connector may also comprise a second type of engagement feature 304, in the form of tabs or slots near the ferrule retaining portion 12 of the conversion housing 10, for interfacing with a type SC conversion housing 300. In these embodiments, the adhesive injection ports 70 may be separated from the conversion housing engagement features 204, 304 by the sealing element retaining portion of the connector housing 10, along the longitudinal axis of the connector housing 10, to help ensure that any excess adhesive or other surface irregularities created on the outer surface of the connector housing 10 when adhesive is injected into the interior potting cavity of the connector housing 10 through the adhesive injection ports 70 will not interfere with proper engagement with the conversion housings 200, 300.

As is illustrated in FIGS. 10 and 12, the keying feature 17, the sealing element retention features 11a, 11b, the ferrule retention features 12a, 12b, and the locking feature 19 may be defined in the connector housing 10 in a variety of ways including, for example, as projections, depressions, or cutouts, formed on or in an outer or inner surface of the connector housing 10, through the connector housing 10, or combinations thereof.

It is noted that recitations herein of a component of the present disclosure being "structurally configured" in a particular way, to embody a particular property, or to function in a particular manner, are structural recitations, as opposed to recitations of intended use. More specifically, reference herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A connectorized fiber optic cable assembly comprising:
  a connector housing comprising a ferrule retaining portion, an adapter seating portion, and a longitudinal axis extending through the ferrule retaining portion of the connector housing and the adapter seating portion of the connector housing;
  a ferrule retained by the ferrule retaining portion of the connector housing, the ferrule comprising an optical fiber bore;
  a cable adapter comprising an optical cable passageway, an optical fiber passageway, an extension securement portion, a housing insert portion seated in the adapter seating portion of the connector housing, and an adapter abutment positioned between the extension securement portion and the housing insert portion, wherein the adapter abutment limits an extent to which the cable adapter extends into the adapter seating portion of the connector housing;
  an adapter extension secured to the extension securement portion of the cable adapter and comprising an extended cable passageway;
  a fiber optic cable extending along the extended cable passageway of the adapter extension and the optical cable passageway of the cable adapter, the fiber optic cable comprising an optical fiber extending along optical fiber passageway of the cable adapter to the optical fiber bore of the ferrule; and
  a multi-diametrical sealing flexure comprising a cable engaging portion engaging an outer cable surface of the fiber optic cable, a housing engaging portion engaging an outer housing surface of the connector housing, and an intermediate flexure portion extending from the cable engaging portion to the housing engaging portion and engaging an outer extension surface of the adapter extension.

2. The connectorized fiber optic cable assembly of claim 1 wherein:
  the connector housing is characterized by a Young's modulus $E_H$;
  the cable adapter is characterized by a Young's modulus $E_A$, which is less than $E_H$;
  the adapter extension is characterized by a Young's modulus $E_E$, which is less than $E_A$; and
  the multi-diametrical sealing flexure is characterized by a Young's modulus $E_F$, which is less than $E_E$.

3. The connectorized fiber optic cable assembly of claim 2 wherein:
  the adapter extension is characterized by a Young's modulus of between about 80 MPa and about 500 MPa, at room temperature; and
  the multi-diametrical sealing flexure is characterized by a Young's modulus of between about 30 MPa and about 80 MPa, at room temperature.

4. The connectorized fiber optic cable assembly of claim 3 wherein:
  the connector housing is characterized by a Young's modulus of between about 2000 MPa and about 6000 MPa, at room temperature; and
  the cable adapter is characterized by a Young's modulus of between about 1500 MPa and about 6000 MPa, at room temperature.

5. The connectorized fiber optic cable assembly of claim 1 wherein the cable assembly comprises a multicomponent bending stiffness profile comprising a first bending index value B1 at a free end of the extension securement portion of the cable adapter, a second bending index value B2 at a free end of the adapter extension, and a third bending index value B3 at a free end of the multi-diametrical sealing flexure, where B1>B2>B3.

6. The connectorized fiber optic cable assembly of claim 5 wherein the third bending index value B3 represents a degree of resistance to bending that is greater than that of the fiber optic cable.

7. The connectorized fiber optic cable assembly of claim 5 wherein B1>2(B2) and where B2>2(B3).

8. The connectorized fiber optic cable assembly of claim 5 wherein the multicomponent bending stiffness profile further comprises a housing bending index B0 that is at least three times greater than the first bending index value B1.

9. The connectorized fiber optic cable assembly of claim 1 wherein:
the connectorized fiber optic cable assembly comprises a cable entry interface, an adapter abutment interface, and an adapter sealing interface;
the cable entry interface is formed by an inner surface of the extended cable passageway of the adapter extension and an outer surface of the fiber optic cable, where the fiber optic cable extends into the extended cable passageway of the adapter extension towards the ferrule;
the adapter abutment interface is formed by the adapter extension and the adapter abutment of the cable adapter, where the adapter extension contacts an extension-facing surface of the adapter abutment;
the adapter sealing interface is formed by the adapter abutment and the connector housing, where the adapter abutment contacts an abutment facing surface of the connector housing; and
the multi-diametrical sealing flexure forms respective sealing bridges across the cable entry interface, the adapter abutment interface, and the adapter sealing interface.

10. The connectorized fiber optic cable assembly of claim 9 wherein:
the adapter abutment interface and the adapter sealing interface are orthogonal to the longitudinal axis of the connector housing; and
the cable entry interface is displaced from and oriented in a common direction as the longitudinal axis of the connector housing.

11. The connectorized fiber optic cable assembly of claim 9 wherein:
the cable entry interface originates at a cable-to-connector elbow;
the adapter sealing interface originates at a housing-to-adapter elbow;
the cable-to-connector elbow and the housing-to-adapter elbow are oriented in opposite directions relative to the longitudinal axis; and
the multi-diametrical sealing flexure forms respective sealing bridges across the cable-to-connector elbow and the oppositely directed housing-to-adapter elbow.

12. The connectorized fiber optic cable assembly of claim 11 wherein the housing-to-adapter elbow comprises an exposed anchoring face oriented towards the ferrule retaining portion of the connector housing.

13. The connectorized fiber optic cable assembly of claim 1 wherein:
the optical fiber passageway is positioned along the longitudinal axis between the optical cable passageway of the cable adapter and the ferrule; and
the optical cable passageway of the cable adapter is larger than the optical fiber passageway of the cable adapter.

14. The connectorized fiber optic cable assembly of claim 1 wherein:
the housing insert portion of the cable adapter extends from the adapter abutment along the longitudinal axis towards the ferrule for a seated length $d_S$;
the extension securement portion of the cable adapter extends from the adapter abutment in an opposite direction along the longitudinal axis for an extension receiving length $d_R$; and $$d_R < d_S.$$

15. The connectorized fiber optic cable assembly of claim 14 wherein:
the free end of the extension securement portion of the cable adapter is displaced from a free end of the adapter extension along the longitudinal axis by an effective extension length $d_E$; and $$d_R < d_E.$$

16. The connectorized fiber optic cable assembly of claim 1 wherein:
the adapter extension is characterized by a Young's modulus of between about 80 MPa and about 500 MPa, at room temperature;
the extended cable passageway of the adapter extension is between about 15 millimeters and about 30 millimeters in length; and
the adapter extension comprises a wall thickness that is between about 1 millimeter and about 4 millimeters over a majority of the length of the extended cable passageway of the adapter extension.

17. The connectorized fiber optic cable assembly of claim 1 wherein the extended cable passageway of the adapter extension is at least about 10% as long as a connectorized span of the cable assembly, excluding the multi-diametrical sealing flexure.

18. The connectorized fiber optic cable assembly of claim 1 wherein:
the adapter extension comprises an interior adapter-engaging surface that is rotationally asymmetric relative to the longitudinal axis; and
the extension securement portion of the cable adapter comprises an exterior surface that complements the rotational asymmetry of the interior adapter-engaging surface of the adapter extension.

19. The connectorized fiber optic cable assembly of claim 18 wherein the interior adapter-engaging surface of the adapter extension and the exterior surface of the extension securement portion of the cable adapter comprise complementary locking projections and locking recesses.

20. The connectorized fiber optic cable assembly of claim 18 wherein:
the adapter extension comprises an exterior surface spanning a substantial entirety of the adapter extension; and
the exterior surface of the adapter extension is rotationally symmetric.

21. The connectorized fiber optic cable assembly of claim 1 wherein the connectorized fiber optic cable assembly further comprises a subcutaneous sealing element positioned between an outer surface of the connector housing and an inner surface of the multi-diametrical sealing flexure.

22. The connectorized fiber optic cable assembly of claim 21 wherein the subcutaneous sealing element bounds an entire rotational periphery of the connector housing about the longitudinal axis of the connector housing and cooperates with the multi-diametrical sealing flexure to form an annular projection in an outer surface of the multi-diametrical sealing flexure.

23. The connectorized fiber optic cable assembly of claim 22 wherein the outer surface of the connector housing comprises a seal accommodating groove and the subcutaneous sealing element is positioned in the seal accommodating groove.

24. The connectorized fiber optic cable assembly of claim 1 wherein:
the connector housing is characterized by a Young's modulus $E_H$;
the cable adapter is characterized by a Young's modulus $E_A$, which is less than $E_H$;
the adapter extension is characterized by a Young's modulus $E_E$, which is less than $E_A$;
the multi-diametrical sealing flexure is characterized by a Young's modulus $E_F$, which is less than $E_E$;
the cable assembly comprises a multicomponent bending stiffness profile comprising a first bending index value B1 at a free end of the extension securement portion of the cable adapter, a second bending index value B2 at a free end of the adapter extension, and a third bending index value B3 at a free end of the multi-diametrical sealing flexure, where B1>B2>B3;
the cable assembly comprises a first bending terminus at a free end of the extension securement portion of the cable adapter, a second bending terminus at a free end of the adapter extension, and a third bending terminus at a free end of the multi-diametrical sealing flexure;
the free end of the adapter extension is displaced from the free end of the extension securement portion of the cable adapter along the longitudinal axis by an effective extension length $d_E$;
the free end of the multi-diametrical sealing flexure is displaced from the free end of adapter extension by an effective flexure length $d_F$;

$$1 \le \frac{d_F}{d_E} \le 4;$$

the connectorized fiber optic cable assembly comprises a cable entry interface, an adapter abutment interface, and an adapter sealing interface;
the cable entry interface is formed by an inner surface of the extended cable passageway of the adapter extension and an outer surface of the fiber optic cable, where the fiber optic cable extends into the extended cable passageway of the adapter extension towards the ferrule;
the adapter abutment interface is formed by the adapter extension and the adapter abutment of the cable adapter, where the adapter extension contacts an extension-facing surface of the adapter abutment;
the adapter sealing interface is formed by the adapter abutment and the connector housing, where the adapter abutment contacts an abutment facing surface of the connector housing;
the multi-diametrical sealing flexure forms respective sealing bridges across the cable entry interface, the adapter abutment interface, and the adapter sealing interface;
the cable entry interface originates at a cable-to-connector elbow;
the adapter sealing interface originates at a housing-to-adapter elbow;
the cable-to-connector elbow and the housing-to-adapter elbow are oriented in opposite directions relative to the longitudinal axis;
the multi-diametrical sealing flexure forms respective sealing bridges across the cable-to-connector elbow and the oppositely directed housing-to-adapter elbow;
the housing-to-adapter elbow comprises an exposed anchoring face oriented towards the ferrule retaining portion of the connector housing;
the adapter extension comprises an interior adapter-engaging surface that is rotationally asymmetric relative to the longitudinal axis; and
the extension securement portion of the cable adapter comprises an exterior surface that complements the rotational asymmetry of the interior adapter-engaging surface of the adapter extension.

25. A connectorized fiber optic cable assembly comprising:
a connector housing comprising a ferrule retaining portion, an adapter seating portion, and a longitudinal axis extending through the ferrule retaining portion of the connector housing and the adapter seating portion of the connector housing;
an ferrule retained by the ferrule retaining portion of the connector housing, the ferrule comprising an optical fiber bore aligned with the longitudinal axis of the connector housing;
a cable adapter characterized by a Young's modulus $E_A$ and comprising an optical cable passageway, an optical fiber passageway, a housing insert portion seated in the adapter seating portion of the connector housing, and an adapter abutment;
an adapter extension integrated with the cable adapter, the adapter extension characterized by a Young's modulus $E_E$, which is less than $E_A$, and comprising an extended cable passageway, wherein the adapter abutment of the cable adapter is positioned between the adapter extension and the housing insert portion of the cable adapter and limits an extent to which the cable adapter extends into the adapter seating portion of the connector housing;
a fiber optic cable extending along the extended cable passageway of the adapter extension and the optical cable passageway of the cable adapter, the fiber optic cable comprising an optical fiber extending along optical fiber passageway of the cable adapter to the optical fiber bore of the ferrule; and
a multi-diametrical sealing flexure comprising a cable engaging portion engaging an outer cable surface of the fiber optic cable, a housing engaging portion engaging an outer housing surface of the connector housing, and an intermediate flexure portion extending from the cable engaging portion to the housing engaging portion and engaging an outer extension surface of the adapter extension.

26. The connectorized fiber optic cable assembly of claim 25 wherein the cable adapter and the adapter extension comprise a unitary molded part.

* * * * *

UNITED STATES PATENT AND TRADEMARK OFFICE
CERTIFICATE OF CORRECTION

PATENT NO. : 10,429,593 B2  
APPLICATION NO. : 16/015583  
DATED : October 1, 2019  
INVENTOR(S) : Adra Baca et al.

Page 1 of 1

It is certified that error appears in the above-identified patent and that said Letters Patent is hereby corrected as shown below:

On the Title Page

On page 5, Column 2, item (56), other publications, Line 28, delete "Cleartield" and insert -- Clearfield --, therefor.

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*